US012297679B2

(12) United States Patent
Dunstan

(10) Patent No.: US 12,297,679 B2
(45) Date of Patent: May 13, 2025

(54) SECURITY DOOR MOUNTING ARRANGEMENT

(71) Applicant: Lokaway Pty. Ltd., Cranbourne (AU)

(72) Inventor: Brett Dunstan, Cranbourne (AU)

( * ) Notice: Subject to any disclaimer, the term of this patent is extended or adjusted under 35 U.S.C. 154(b) by 1282 days.

(21) Appl. No.: 16/962,697

(22) PCT Filed: Jan. 16, 2019

(86) PCT No.: PCT/AU2019/000007
§ 371 (c)(1),
(2) Date: Jul. 16, 2020

(87) PCT Pub. No.: WO2019/140480
PCT Pub. Date: Jul. 25, 2019

(65) Prior Publication Data

US 2020/0347655 A1 Nov. 5, 2020

(30) Foreign Application Priority Data

Jan. 16, 2018 (AU) ................................ 2018900133

(51) Int. Cl.
*E05D 11/00* (2006.01)
*E05B 65/00* (2006.01)
(Continued)

(52) U.S. Cl.
CPC ...... *E05D 11/0027* (2013.01); *E05B 65/0075* (2013.01); *E05D 3/02* (2013.01);
(Continued)

(58) Field of Classification Search
CPC ..... E05B 17/20; E05B 65/0075; E05G 1/026; E05G 1/04; E05D 11/0018;
(Continued)

(56) References Cited

U.S. PATENT DOCUMENTS 370,472 A * 9/1887 Gross ........................ E05D 7/14 16/364
2,584,088 A * 1/1952 Floyd ........................ E05C 9/06 70/108
(Continued)

OTHER PUBLICATIONS

International Search Report prepared by the Australian Patent Office for PCT/AU2019/000007, Apr. 15, 2019, 7 pages.
(Continued)

*Primary Examiner* — Christopher J Boswell
(74) *Attorney, Agent, or Firm* — Portland IP, LLC; Abdullah O. Alnajran

(57) ABSTRACT

A security door mounting arrangement for a safe (10) including a substantially rectangular-shaped block for the body (20), having a base (22), a rear wall (in the direction (23), a pair of side walls (24) and a top (25), all defining the cavity (21), and an opening (in the direction (26)) defined by a door jamb (27). A hinged door (40) includes a locking assembly (60), including a crank assembly (62). The crank assembly (62) includes a central crank (63) comprising a disc plate substantially parallel-planar with a main panel of the door (40). The crank (63) is operable by a handle installed on the front face of the door (40). The handle and the central crank are rotatable together coaxially and about a common axis A.

17 Claims, 20 Drawing Sheets

(51) Int. Cl.
*E05D 3/02* (2006.01)
*E05D 7/14* (2006.01)
*E05G 1/026* (2006.01)
*E05G 1/04* (2006.01)

(52) U.S. Cl.
CPC ............... *E05D 7/14* (2013.01); *E05G 1/026* (2013.01); *E05G 1/04* (2013.01); *E05D 2011/0045* (2013.01); *E05Y 2900/21* (2013.01)

(58) Field of Classification Search
CPC ................. E05D 11/0027; E05D 11/06; E05D 2011/0036; E05D 2011/0045
See application file for complete search history.

(56) References Cited

U.S. PATENT DOCUMENTS 3,636,659 A * 1/1972 Bylicki ............... E05D 11/0027 292/DIG. 17
3,866,269 A * 2/1975 Hudgins ............. E05D 11/0027 16/221
4,262,447 A * 4/1981 Schneier ............... E05C 19/006 422/118
4,288,944 A * 9/1981 Donovan ................ E05C 9/042 70/276
5,447,046 A * 9/1995 Duffus .................. E05C 19/003 292/259 R
5,769,473 A * 6/1998 Sovis .................. E05D 11/0027 408/72 R
7,404,363 B2 7/2008 Dunstan
8,459,704 B2 * 6/2013 Daniels ................... E05C 9/048 292/259 R
2007/0000293 A1 1/2007 Daniels et al.
2010/0031857 A1 * 2/2010 Dunstan ................ E05C 19/006 292/336.3

OTHER PUBLICATIONS

Written Opinion prepared by the Australian Patent Office for PCT/AU2019/000007, Apr. 15, 2019, 6 pages.
International Preliminary Report on Patentability prepared by the Australian Patent Office for PCT/AU2019/000007, Apr. 3, 2020, 12 pages.

* cited by examiner

SECURITY DOOR MOUNTING ARRANGEMENT

CROSS-REFERENCE TO RELATED APPLICATIONS

This is a national stage application filed under 35 USC 371 based on International Application No. PCT/AU2019/000007 filed Jan. 16, 2019 and claims priority under 35 USC 119 of Australian Patent Application No. 2018900133 filed Jan. 16, 2018.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable.

STATEMENT REGARDING PRIOR DISCLOSURES BY THE INVENTOR OR A JOINT INVENTOR

Not Applicable.

BACKGROUND OF THE INVENTION

This invention relates to a security door mounting arrangement. More particularly, this invention relates to a security door mounting arrangement for resisting unauthorised entry to a security container.

BACKGROUND ART

The following references to and descriptions of prior proposals or products are not intended to be, and are not to be construed as, statements or admissions of common general knowledge in the art. In particular, the following prior art discussion does not relate to what is commonly or well known by the person skilled in the art, but assists in the understanding of the inventive step of the present invention of which the identification of pertinent prior art proposals is but one part.

Security door hinges have been described in which the hinge comprises an elongate rod mounted, at its respective upper and lower ends, to a body of a security container, for example, to the container body side wall, to a frame defining a door opening, i.e. the door opening jamb.

Accordingly, the rod is not supported intermediate its length and, unless constructed to be of substantial width and strength, is subject to varying degrees of flex in its mid-section. With sufficient penetration and leverage, a lever may be used to jimmy or wedge between the jamb and an edge of the door. This may enable flexing and/or warping, in respect of which the elongate rod is particularly vulnerable, thus weakening the structure and permitting unauthorised entry.

An object of the present invention is to ameliorate the aforementioned disadvantages of the prior art or to at least provide a useful alternative thereto.

BRIEF SUMMARY OF THE INVENTION

The invention according to one or more aspects is as defined in the independent claims. Some optional and/or preferred features of the invention are defined in the dependent claims.

Accordingly, one aspect of the invention is provided in the following statement.

A security door mounting arrangement for securing a door of a container, the container including:

- a jamb defining a closure space in a body of the container;
- a door having a first closure edge, hingedly mounted to the body on or near a first edge of the jamb, and a second closure edge abutting a second edge of the jamb; and
- a locking bolt extendable from the second closure edge and operative to be received in the body, in, on or near the second edge of the jamb in a closed position of the door, wherein:

- the door includes an elongate member that extends along the first closure edge, whereby the door rotates with the elongate member;
- the elongate member is rotatably mounted to, and captured between, spaced brackets, each separately secured to the body;
- intermediate the length of the elongate member, the door further includes a reinforcing member fixedly attached to the internal surface of the door and adapted to resist flexing of the elongate member intermediate its length.

Reinforcing Member

The reinforcing member may include a guide in the form of a channel, sleeve, eyelet or other guide that physically traps a secured length of the elongate member therein. The guide may substantially surround the elongate member. The guide may resist lateral displacement of the elongate member relative to the closure. The guide may be a sleeve fixedly attached to an internal surface of the closure.

The reinforcing member is preferably in the form of a brace arm extending from the elongate member and directly or indirectly attaching to the internal surface of the door. The brace arm may form part of a bracket fixedly secured to the internal surface and the guide may encapsulate a section of the elongate member intermediate its length.

The security door preferably further includes the brace arm. The brace arm may be attached to the elongate member intermediate its length. The brace arm may be connected to a door release mechanism. As the door release mechanism moves to lock or release the door, the brace arm may move toward or away from a bracing member.

The brace arm may be movably attached to the elongate member whereby the attachment permits movement of the brace arm relative to the elongate member in a manner corresponding to the movement of the door release mechanism.

The brace arm may move only when the door release mechanism moves and otherwise resists flexing of the elongate member in a locked position.

The door release mechanism may be adapted to rotate relative to the door. The brace arm may be articulatedly connected to the door release mechanism. The brace arm may comprise a beam that is a substantially linear beam extending from the door release mechanism to the brace arm's outer tip. The beam may be non-linear provided that it is adapted to translate a force vector in the direction of the bracing member, and to abut the bracing member in the locked position.

The outer tip may be movable relative to the remainder of the beam. The outer tip may be axially movable relative to the beam. The outer tip may comprise a shaft threadably engageable to the beam and axially adjustable relative thereto.

The beam may include a hinged connection with the elongate member intermediate their respective lengths. The hinged connection may include a lateral arm that extends from the elongate member. The lateral arm may be fixed relative to the elongate member. The lateral arm preferably rotates with the elongate member. The hinged connection may include a pin extending through or into an eyelet or socket. The pin may be threaded and a nut may be adapted to trap the eyelet or socket.

Secure Container

The container may be a safe. The container may be made from metal or a composite including metal and insulation. The container may be for securing arms, such as guns, including rifles. Accordingly, containers made according to the invention may vary in size and shape, depending on the number of items required to be housed and their size and shape. For example, a container housing long barrel rifles may be between 900-1500 mm, in height or length. The container may be shaped and sized to house one or more pistols or other small firearms. The container may be adapted to lie substantially horizontally with the closure on an upper face, or on a side end of the container. The container may be box-shaped. The container is preferably rectangular box-shaped.

The container may have substantial mass in the base, the walls and/or the closure. The closure is preferably made from steel, welded as a strong box. The container is preferably a safe of extremely strong construction and resistant to unauthorised entry or removal.

The body of the container may comprise three or more walls and a top and base, made of thick plate steel, welded to define a box cavity corresponding to the container's interior. The container preferably has a single opening corresponding to the jamb. The opening is preferably on a side of the container corresponding to its front.

The bracing member may include a panel. The bracing member may form part of a side wall or frame member of the body.

Security Closure

The closure is adapted to securely seal the opening against unauthorised entry. The closure is preferably a door having a rigid and robust structure, resistant to warping or distortion that might be caused by a braced lever. The closure is made from one or more layers of steel plate and/or insulation. The closure may be described as having a "swing and slide" opening and closing motion. To open, the closure may first slide substantially in a plane corresponding to the plane of the door jamb or frame from a trapped position within the door jamb or frame away from the first edge to a released position. In the released position, the closure may be free to swing outwardly to open the container.

Hinge Device

The closure may be hung on and supported by at least one hinge device. The hinge device advantageously includes the elongate member. The hinge device may be adapted to permit rotation of the closure at the first edge about a first axis that is fixed relative to the closure. The first axis may be the longitudinal axis of the elongate member.

Preferably, the hinge device includes at least two hinge axes, namely the first axis and a second axis. The second axis may be parallel to and spaced from the first axis. First and second sections of the elongate member spaced along the length of the elongate member may be rotatably mounted to a corresponding pair of first and second short arms. The first and second sections may be upper and lower sections, and preferably upper and lower ends, respectively. The first and second short arms may be upper and lower portions, respectively. The first and second short arms may be, in turn, rotatably attached to upper and lower portions of the walls, or preferably, to the ceiling and the floor, of the container.

The advantage in such an arrangement may be that, because the elongate member is fixedly mounted to the door, the intermediate or central portion of the elongate member may be braced in the door's closed position against lateral displacement. This not only assists in reinforcing the elongate member against flexing in its mid-section but, compared to arrangements where the elongate member is fixedly mounted to the container wall and/or floor and ceiling, it also permits the elongate member to be made of lighter material and less heavily engineered construction, thereby providing in the inventive arrangement an economic benefit over the prior art.

Lock Assembly

The closure may have a lock assembly mounted on its interior face, or housed in a cavity within the closure.

The second edge of the closure is preferably opposed to the first edge. However, there may be provided one or more bolts. An additional locking bolt may be provided in, near or adjacent a third or fourth edge normal to the first and second edges. The third or fourth edges may be upper and lower edges of the closure, respectively.

The locking bolt may include an elongate shaft. The shaft may be curved to travel through an arcuate path. The locking bolt may actuated by a rotating mechanism operated by a rotatable handle. The shaft may be linear. The bolt may be adapted to reciprocally translate along a linear path, being trapped against lateral movement, but permitted to slide back and forth. The actuating mechanism may include a driven toothed wheel operably connected to the shaft and having corresponding teeth meshed with the wheel. The rotating mechanism may include an articulated arm mounted at one end to the periphery of a rotatable disc. Another remote end of the articulated arm may be mounted to the locking bolt. The locking bolt may be adapted to travel along a substantially linear pathway. Rotation of the disc may be adapted to reciprocatably retract the articulated arm, and hence the bolt and closure, into an open position, or to extend the articulated arm, and hence the locking bolt and closure, into a closed position.

The bolt may comprise a hollow shaft. The bolt may include longitudinally aligned or spiral ribs for reinforcement and strengthening. The bolt is preferably solid and adapted to withstand strong lateral bending forces. The bolt is preferably made of steel.

The closure may include a guard member. The guard member is preferably aligned in a plane transverse to the direction of reciprocal travel of the bolt. The guard member is preferably welded to the internal surface of the closure. The guard member may be formed from angle plating. The guard member may be formed from an L-angle with one arm of the angle welded to the internal surface of the closure.

The guard member may be a continuous length extending substantially the full length of the second edge. In any case, the guard member preferably provides a guard substantially the full length of the second edge with a view to resisting interposition of a lever or other tool used for unauthorised entry by insertion between the second edge and the jamb. To accommodate one or more lateral reinforcing studs that may be included that extend across the slot between the barrier panel and the jamb and to permit the guard member to enter into the slot, the continuity of the guard member along the length of the second edge may be interrupted by a gap accommodating each of the lateral studs. The guard member is preferably positioned close to the jamb at the second edge so that a sharp tool cannot be easily inserted, to any extent sufficient to allow leverage, into the space between the second edge and the jamb. The guard member may be made from relative thick plate steel, such as about 2.5-5 mm, and preferably about 3 mm.

The container may include a barrier panel. The barrier panel extends adjacent to the jamb near the second edge when the closure is closed. Together with the jamb, the barrier panel may define an elongate slot. The slot may be continuous without interruption from either location on or near the jamb that the barrier panel is attached to the body. The ends of the barrier panel may be inserted in a slot formed in the body for extra strength. Preferably, the barrier panel ends are welded to internal surfaces of the body. The barrier panel may be made from thick metal plating as with the guard member, but is preferably made of thinner sheet metal, for example about 1-2.5 mm in thickness. For increased lateral strength and resistance against lateral forces, the barrier panel may be folded to form longitudinal grooves, ridges or flanges. The barrier panel form part of a channel section shaped to include a wall flange attached to the body, and a bridge section intermediate and extending between the wall flange and the barrier panel. The one or more studs may also extend between the wall and the barrier panel to reinforce the outer free end of the channel constituting the longitudinal edge of the barrier panel closes to the closure.

The path of reciprocal travel of the bolt is adapted to intersect the barrier panel and the guard member and be received in a corresponding bolt hole formed in the body facing the second edge when the closure is closed.

Therefore, when the closure is closed, the guard member provides a first obstruction to a would-be tamperer. The barrier panel provides a second wall to maintain stiffness of the guard member in the case of an attack.

The nesting of the guard member in the slot.

The guard member and the barrier panel may not extend the full way across the jamb, but may be located in the zone of the one or more locking bolts, so that a significant proportion of the closure is protected with the lock assembly, but it is accepted that an intruder may jimmy part of a closure spaced from the lock assembly, but still remain unsuccessful in accessing the cavity and the container contents.

Reinforcement intermediate the length of the elongate member against lateral forces provides strong resistance against tampering focussed on the closure hinge and the first edge. The locking assembly further provides resistance against tampering focussed on the second edge of the closure.

BRIEF DESCRIPTION OF THE SEVERAL VIEWS OF THE DRAWINGS

The invention may be better understood from the following non-limiting description of preferred embodiments, in which:

FIG. **1*a*** is a rear internal view of a guide member and part of a crank assembly, and a security door in a closed position, according to a first embodiment of the invention;

Figure 3:
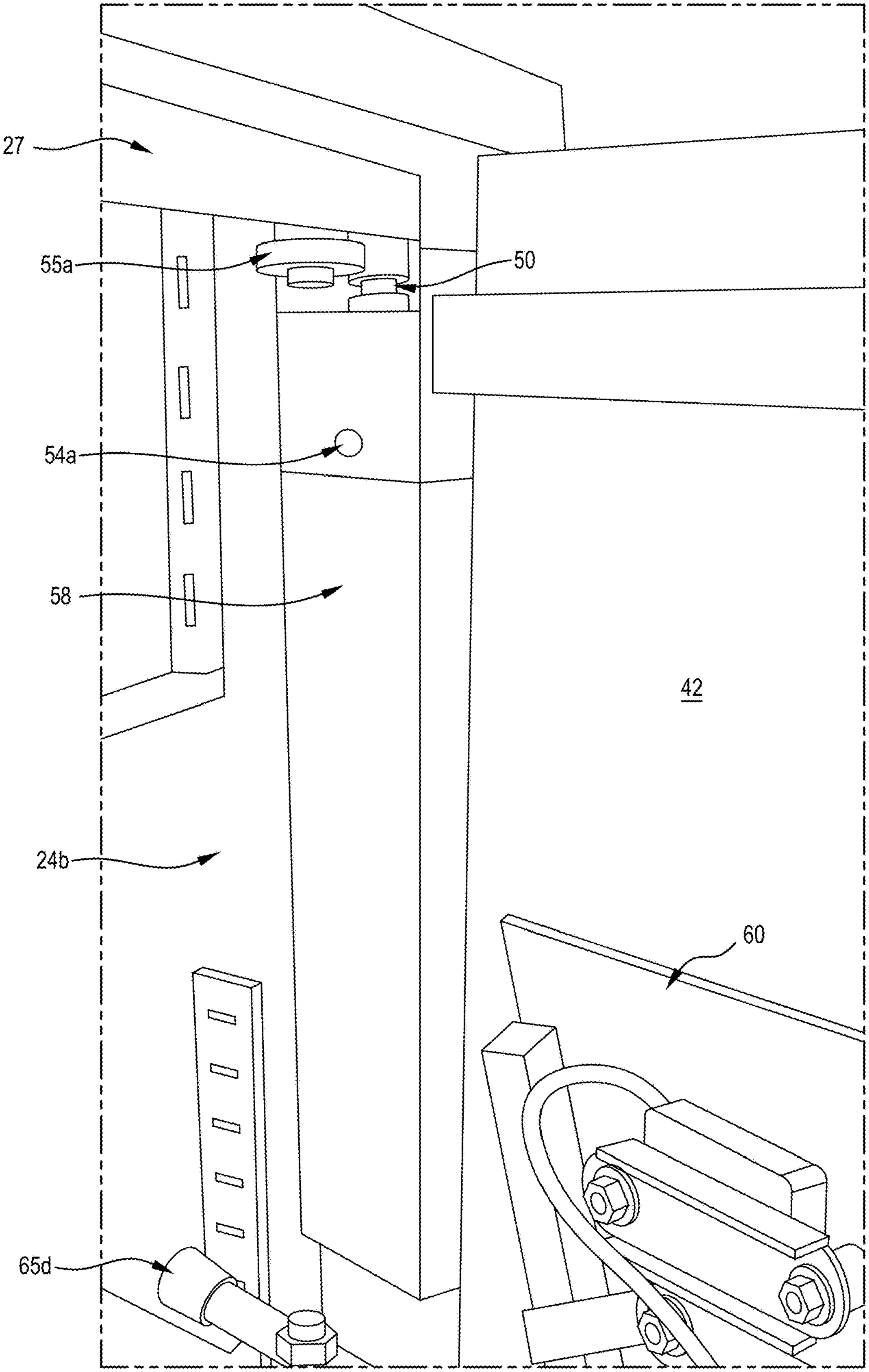

FIG. **1*b*** is a rear internal view of part of the guide member and the crank assembly of the first embodiment;

FIG. **1*c*** is a rear internal view of the guide member and the crank assembly of the first embodiment;

FIG. **1*d*** is a rear perspective view of part of the guide member and Figures the crank assembly of the first embodiment;

FIG. **1*e*** is a rear internal view of the guide member and the crank assembly of the first embodiment;

FIG. **1*f*** is a rear internal view of a stopper end of the guide member of the first embodiment;

FIGS. **2*a*-2*f*** are rear internal views of the guide member and crank assembly according to the first embodiment progressively showing the relational movement of the guide member and the crank assembly;

FIG. **2*g*** is a rear perspective view of the guide member according to the first embodiment;

FIG. **2*h*** is a perspective view of the crank assembly and a movable door rail according to the first embodiment;

FIG. **2*i*** is a rear perspective view of an upper hinge arrangement according to the first embodiment;

FIG. **2*j*** is a rear perspective view of a lower hinge arrangement according to the first embodiment;

FIG. 3 is a rear perspective view of an upper hinge member according to a second embodiment of the invention; and FIGS. **4*a*-4*c*** are rear internal views of a guide member and crank assembly according to a third embodiment progressively showing the relational movement of an elongate member and the crank assembly.

DETAILED DESCRIPTION OF THE DRAWINGS

Preferred features of the present invention will now be described with particular reference to the accompanying drawings. However, it is to be understood that the features illustrated in and described with reference to the drawings are not to be construed as limiting on the scope of the invention, except as may be recited in the claims accompanying this specification.

Referring to the drawings, there is shown a security door mounting arrangement 60 for securing a door 40 of a container 10. The container 10 includes a jamb 27, the door 40 and a locking bolt 46. The container 10 defines a closure space 21 in a body 20 of the container 10. The door 40 has a hinged or first closure edge 44, hingedly mounted to the body 20 on or near a first hinged edge **28*a* of the jamb 27, and a second closure edge 41 abutting a second bolt-receiving edge 28*b* of the jamb 27. The locking bolt 46 is extendable or moveable from the second closure edge 41 and operative to be received in the body 20, in, on or near the second edge 28*b* of the jamb 27 in a closed position of the door 40. The door 40 includes an elongate member 50 that extends along the first closure edge 44, whereby the door 40 rotates with the elongate member 50. The elongate member 50 is rotatably mounted to, and captured between, spaced brackets 54*a,b*, each bracket 54*a,b* being separately secured to the body 20. Intermediate the length of the elongate member 50, the door 40 further includes a reinforcing member 51 fixedly attached to the internal surface 42 of the door 40 and adapted to resist flexing of the elongate member 50** intermediate its length.

Referring in particular to FIGS. **1*a*-2*j* a first embodiment is shown in which a gun safe 10 has a container body 20**

(shown from a rear internal perspective from the inside of a rear panel looking forward to a rear surface of a door 40 at the front of the container 20 to display internal components and features of the door). The body 20 and door 40 define an internal container space or cavity 21.

The safe 10 includes a substantially rectangular-shaped block for the body 20, having a base 22, a rear wall (in the direction 23), a pair of side walls 24 and a top 25, all defining the cavity 21, and an opening (in the direction 26) defined by a door jamb 27.

The hinged door 40 includes a locking assembly 60, including a crank assembly 62. The crank assembly 62 includes a central crank 63 comprising a disc plate substantially parallel planar with a main panel of the door 40. The crank 63 is operable by a handle installed on the front face of the door 40. The handle and the central crank are rotatable together coaxially and about a common axis A.

Figure 1A:
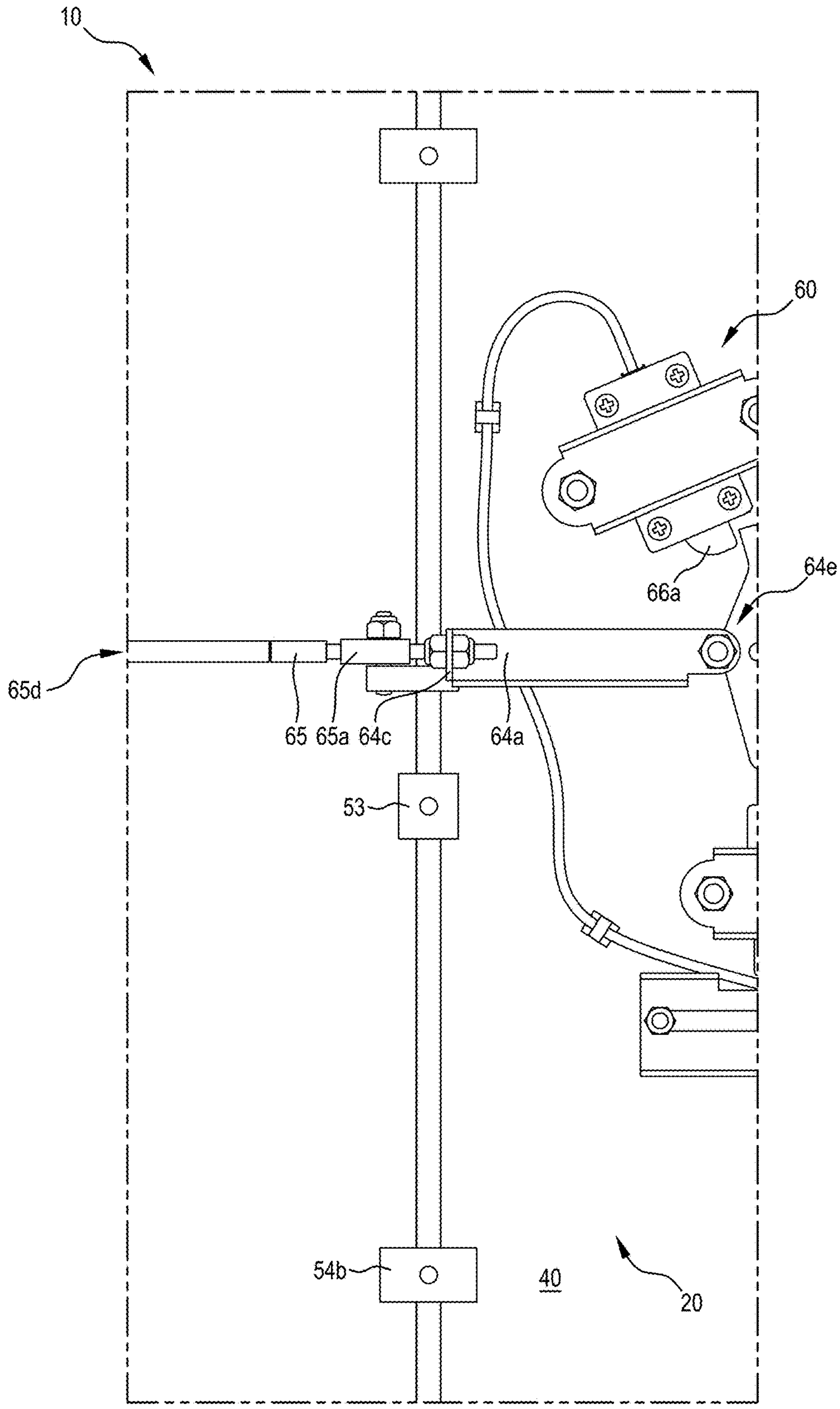
Figure 1B:
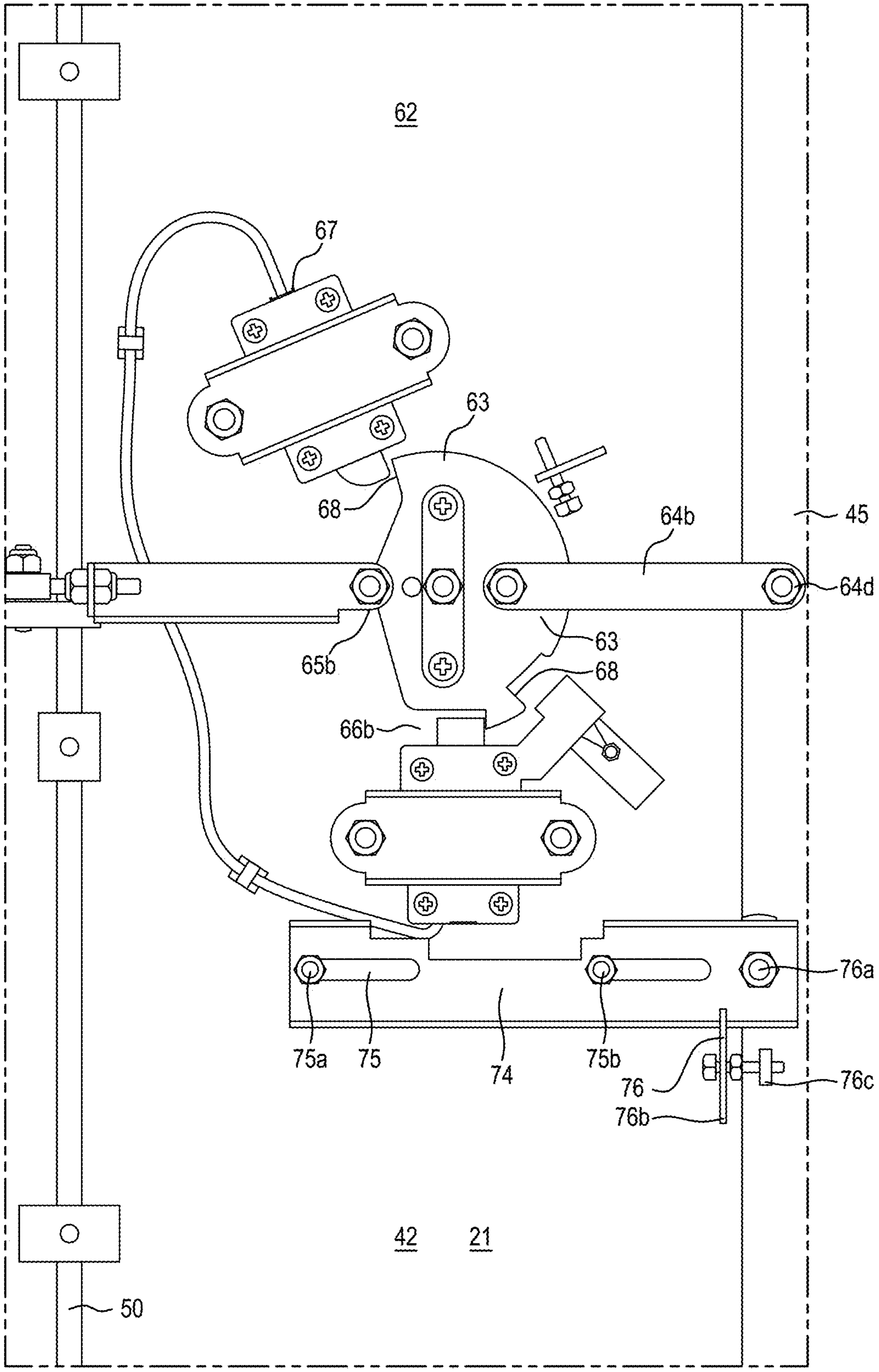
Figure 1C:
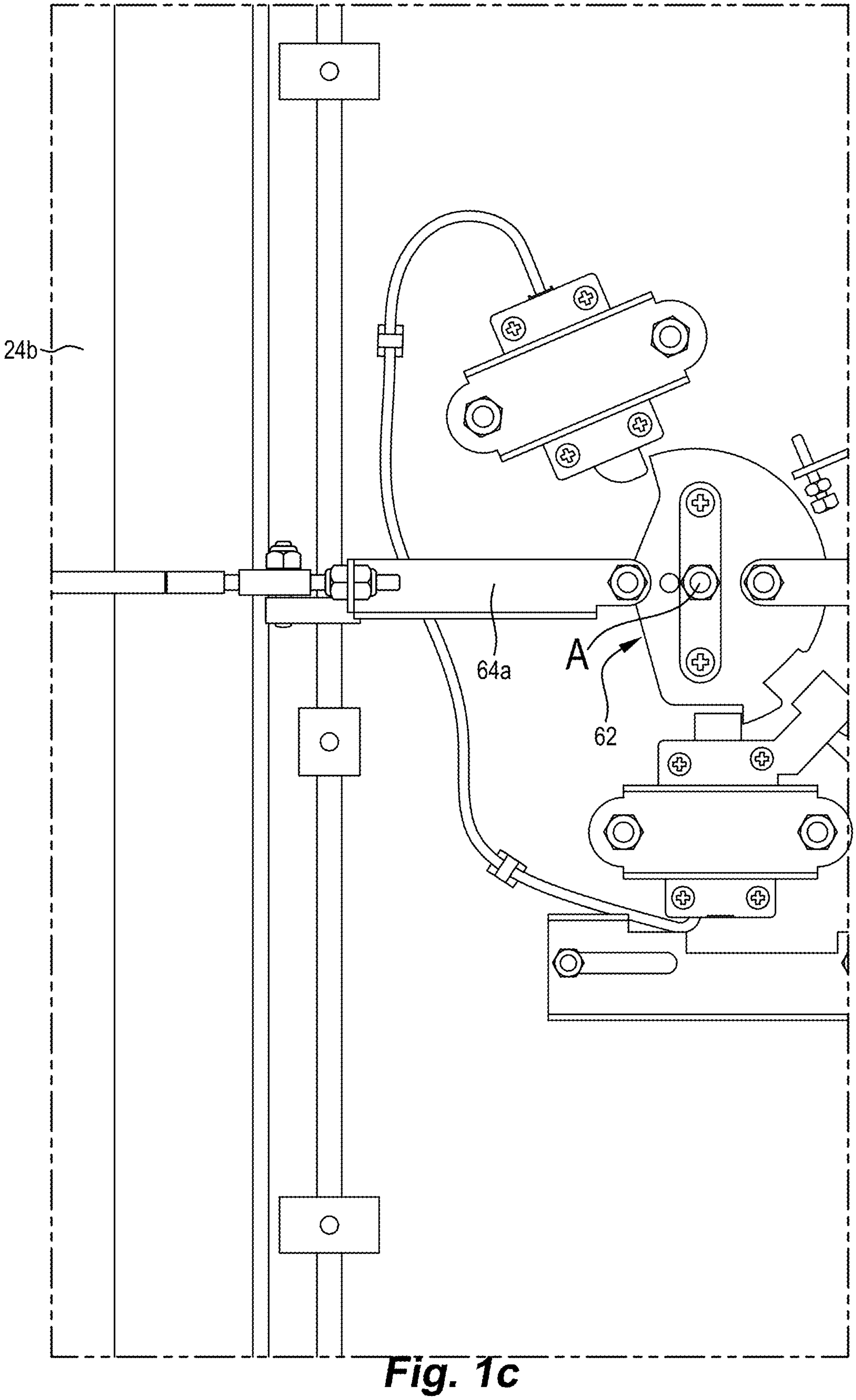
Figure 1D:
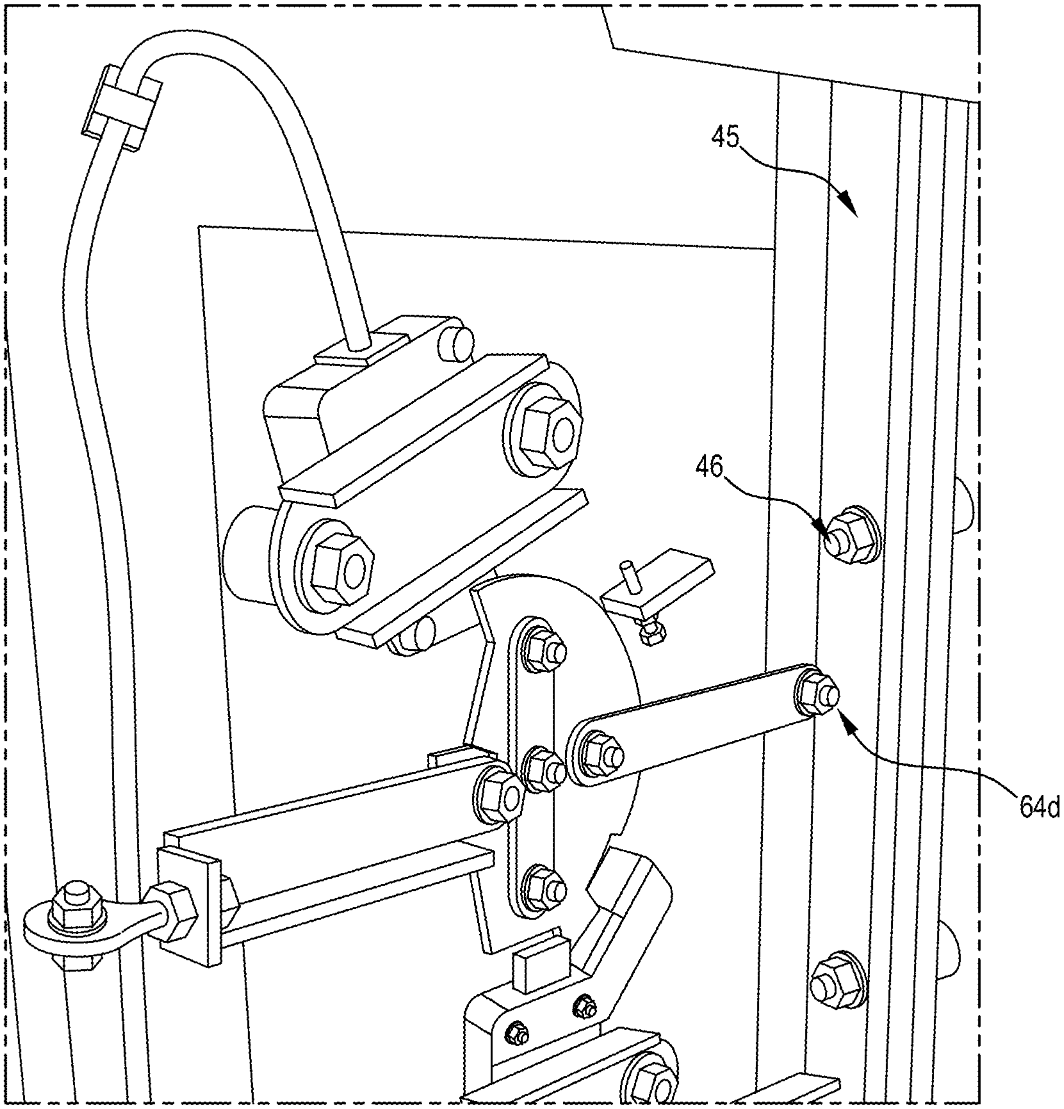
Figure 1E:
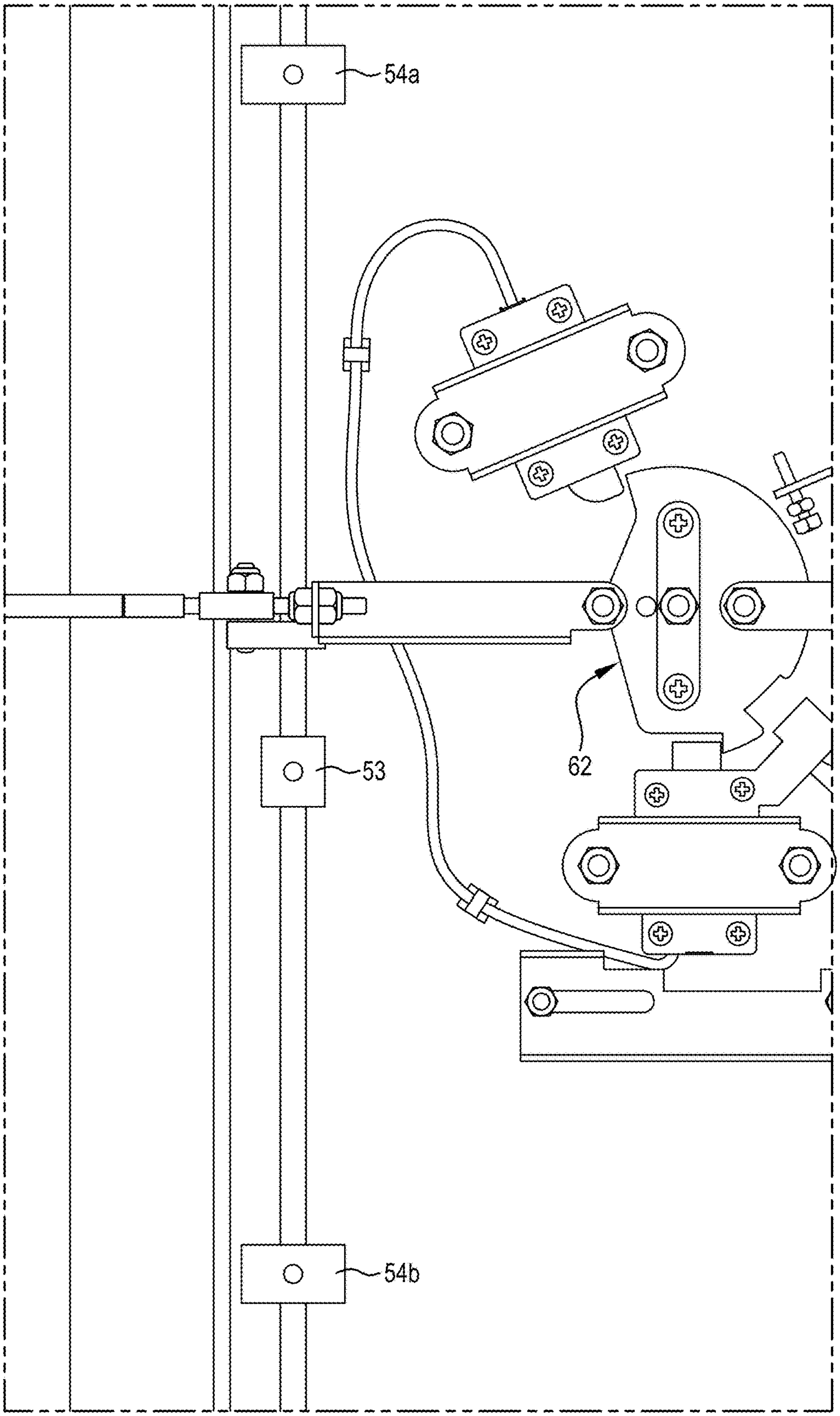
Figure 1F:
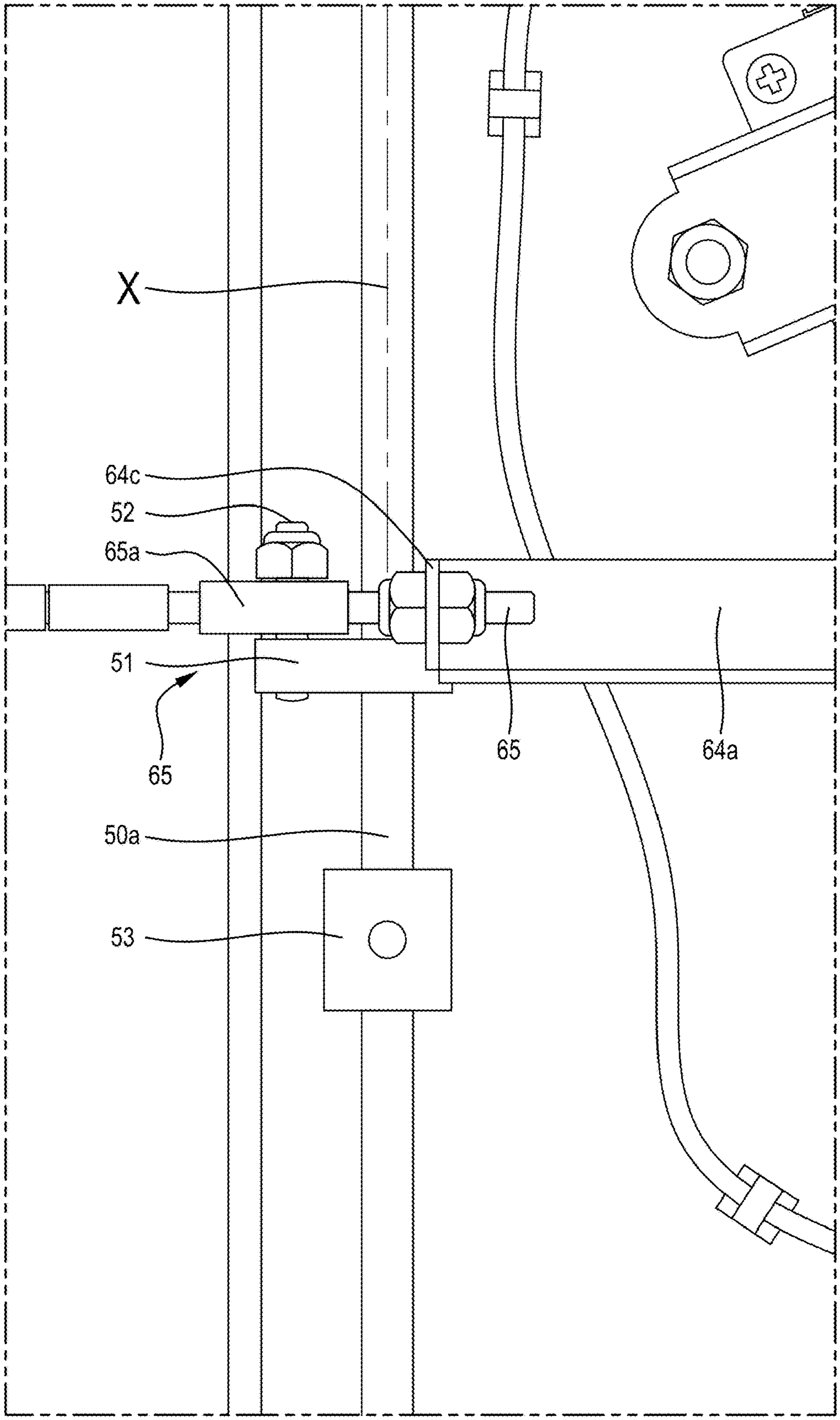

Mounted in opposed relationship on the crank 62 are a pair of articulated arms 64. In the locking assembly's 60 closed position shown in FIGS. 1*a*-2*a*, the arms 64 are aligned in substantially linear relationship. A first arm 64*a* of the arms 64 terminates in a brace arm which is in the form of an eyebolt 65. The eyebolt 65 is fixed relative to the first arm 64*a* and extends in substantially linear or substantially coaxial relationship with the first arm 64*a*. As shown in FIG. 1*f*, the eyebolt 65 has an aperture or eyelet 65*a* intermediate the length of the first arm 64*a*. The end of the eyebolt 65 attached to the first arm 64*a* is attached using a pair of threaded nuts to secure a laterally extending and apertured flange 64*c* of the first arm 64*a*, so that the first arm 64*a* and the eyebolt 65 are fixed for integral movement.

Fixed to a section 50*a* of the shaft intermediate the length of the elongate member 50 is a laterally extending guide member 51 in the form of a radially spaced cylinder 51 from which a pin 52 extends upwardly. The pin 52 may be in the form of a threaded bolt and may extend through the cylinder 51. Alternatively, the pin 52 and the cylinder 51 are integrally formed of one piece and the guide member 51. The guide member 51 may be welded or otherwise fixedly attached, for example using a grub screw, to lock a mounting clasp or cylinder against rotation relative to the shaft 50. The guide member 51 may therefore be locked to rotate with the shalt 50. The guide member 51 may be fixedly mounted about the mid-shaft section 50*a*.

The elongate member 50 is mounted intermediate its length to the internal face 42 of the door 40 by a hinge journal 53 which is a cylindrical tube welded to the internal face 42, so that the axis X is fixed relative to the door 40. Further vertically spaced upper and lower brackets 54*a,b* (shown in FIGS. 1*e*, 2*i* and 2*j*) provide spacing and mounting points for a hinge cover 58 (see the description with respect to the second embodiment).

Figure 2A:
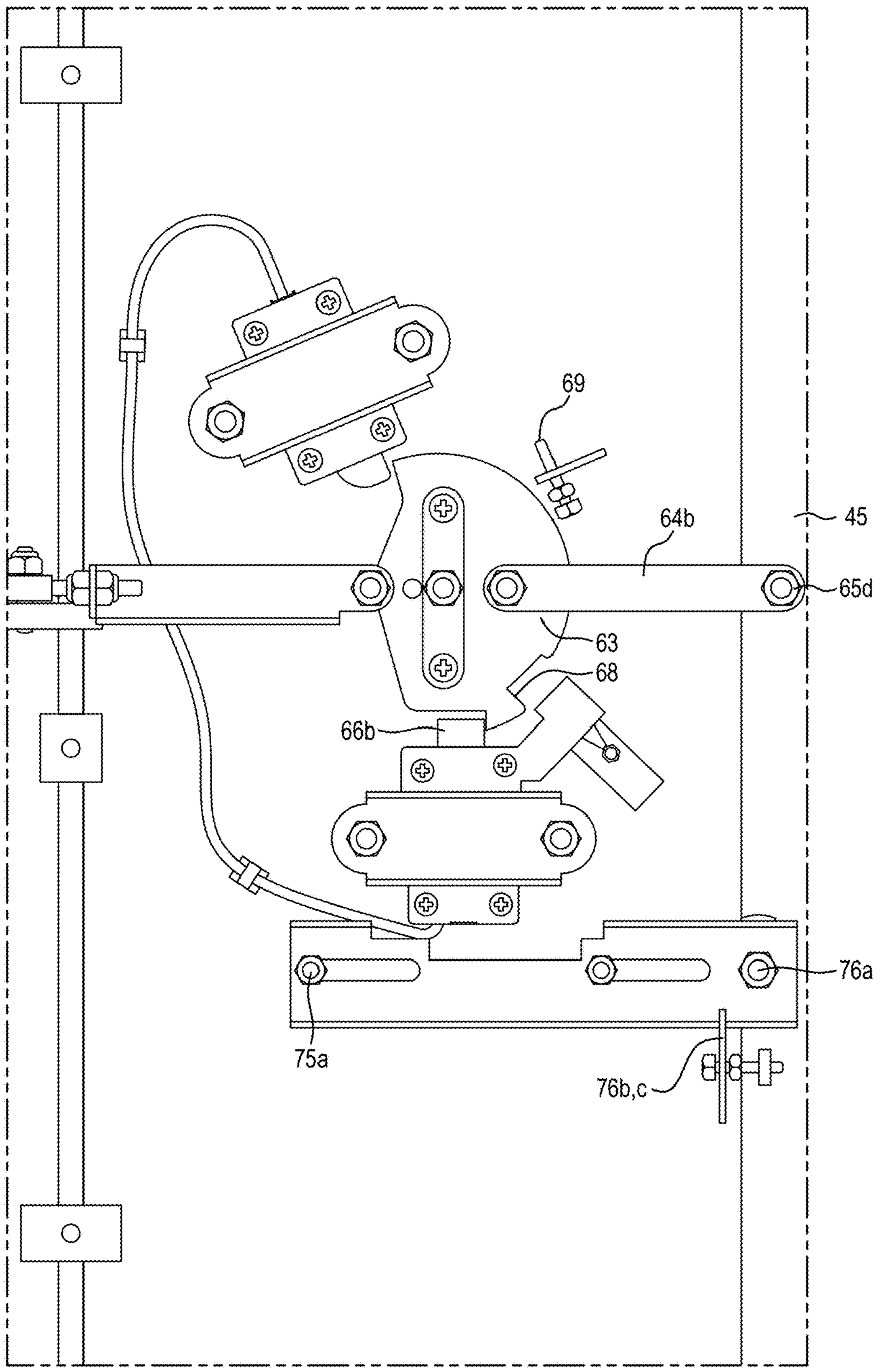
Figure 2B:
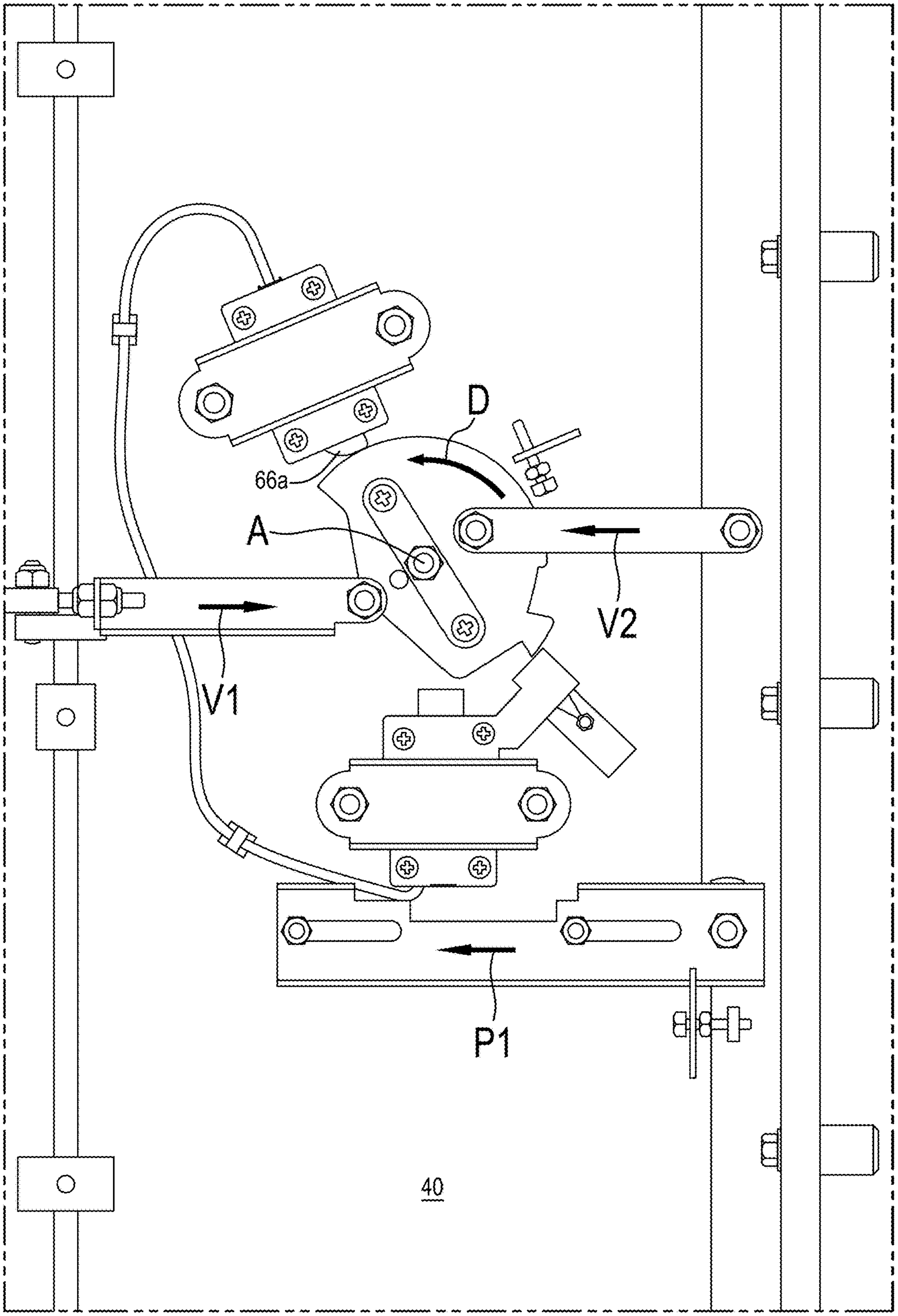
Figure 2C:
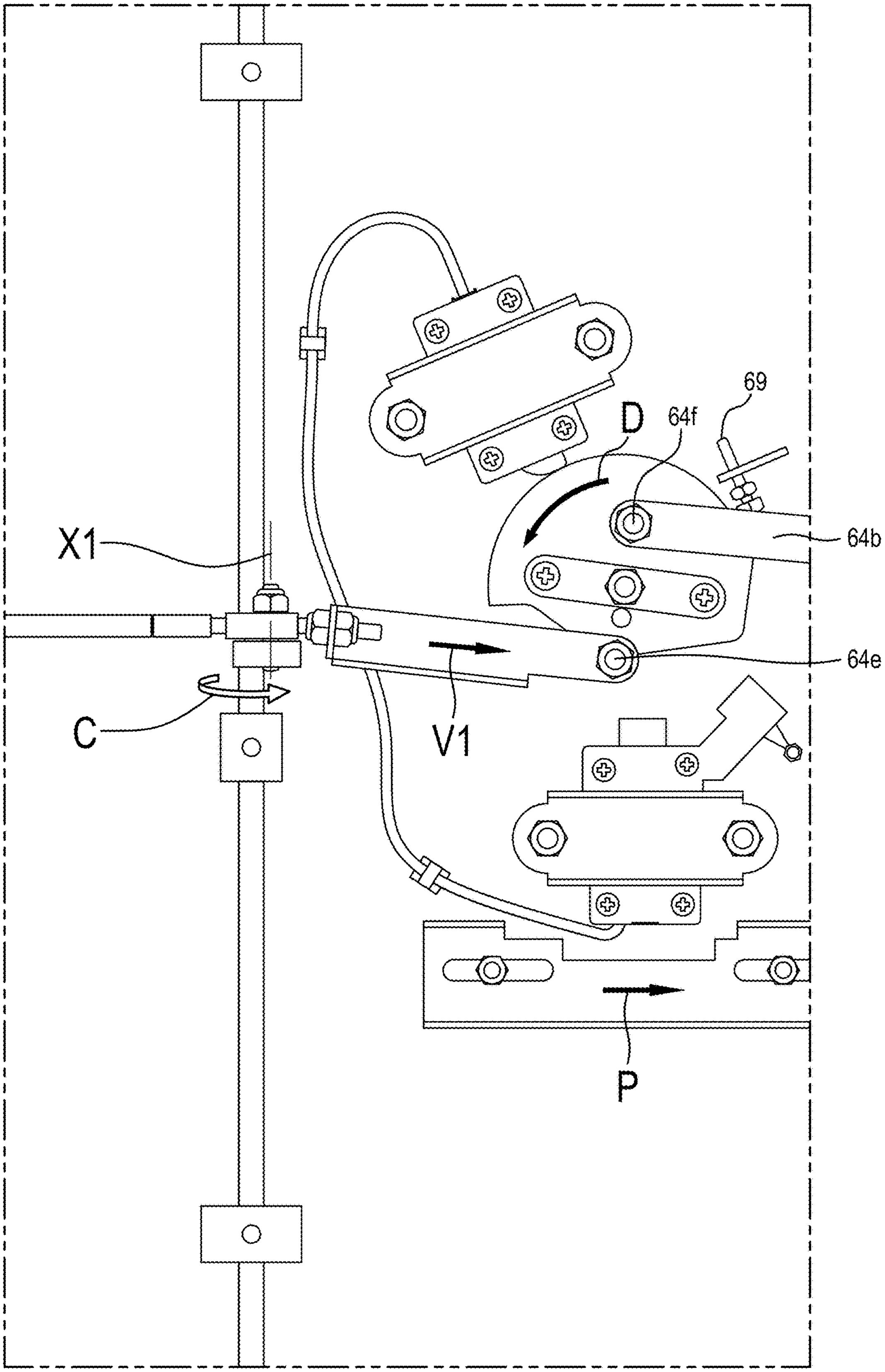
Figure 2D:
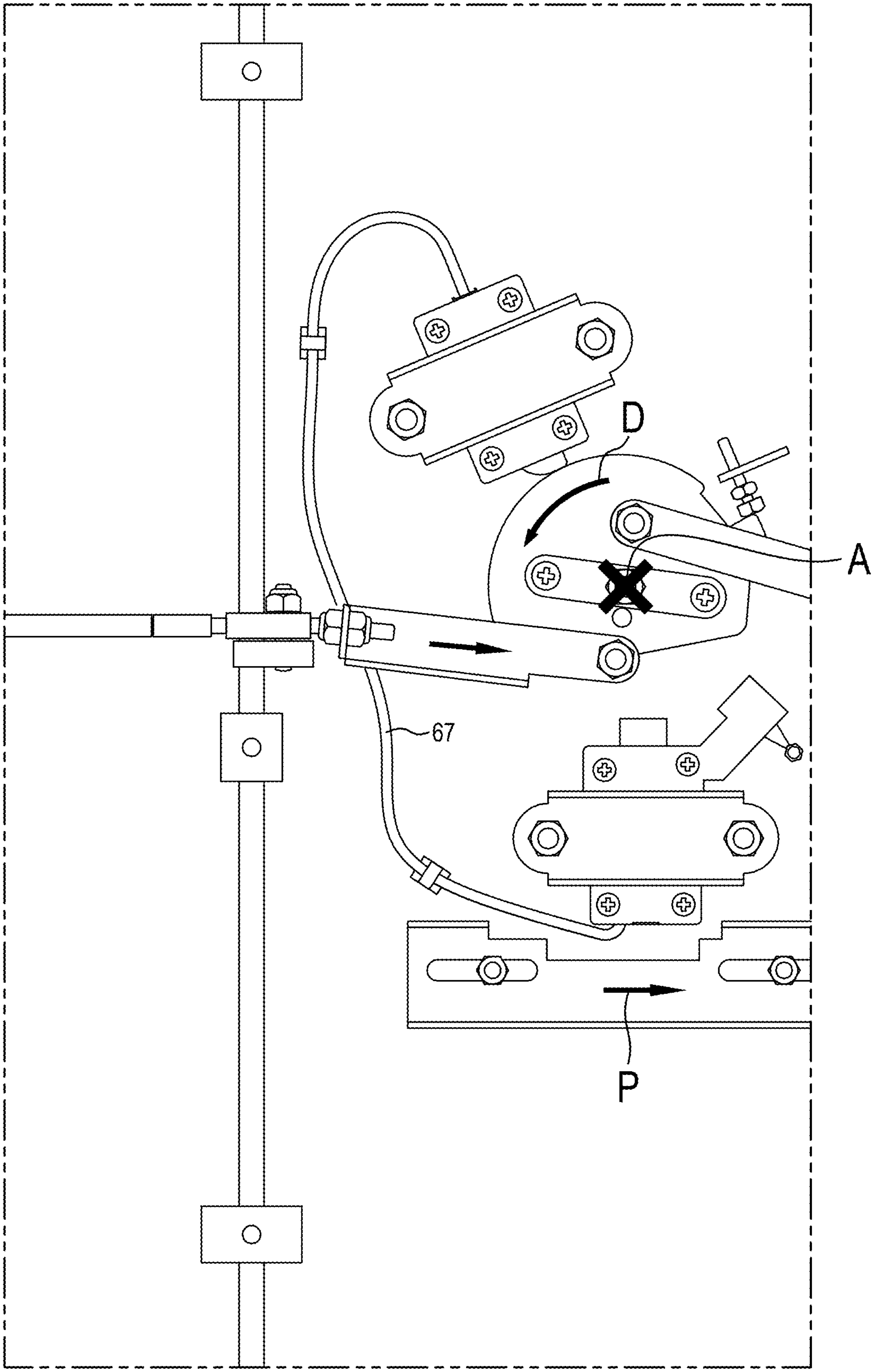

The eyelet 65*a* of the brace arm 65 rotates with the shaft section 50*a*, travelling through an arc C (see FIG. 2*c*). The arc C has a rotational axis $X_1$ that is coaxial with the shaft 50. The brace arm 64*a* is spaced radially from the shaft's 50 axis X and is adapted to reciprocally travel through the arc C as the shaft 50 rotates clockwise and anticlockwise. As the disc plate 63 rotates in direction D, the brace arm 65 rocks or tilts in a direction opposite to direction T.

Similarly, the crank reciprocally rotates clockwise and anticlockwise, together with the handle. The handle and crank 63 of the locking mechanism 62 is released from a locked and closed position shown in FIG. 1*b* by retraction of one or more retractable electro-mechanical locks. The electro-mechanical locks include one or more detents. The electro-mechanical locks shown in FIGS. 1*a-b* include detents 66*a,b* controlled by electronic actuators. In the embodiment shown, the actuators are solenoids. The actuator may include a purely mechanical lever and lock mechanism. The actuator may be motorised, using a small rotating motor that is internal to the lock body.

Electronic actuation or retraction of the detents 66*a,b* may be controlled by a combination locking mechanism. Preferably, the extension or retraction of the detents 66*a,b* is controlled by a standard key or keypad control device operable from the front face of the door 40. The control device, on activation, sends an actuation or retraction signal to the electronic motors or switches controlling the detents 66*a,b* via wires or cables 67. The electro-mechanical detents 66*a,b* may be radio-controlled in an alternative embodiment of the invention.

The crank 63 includes corresponding shoulders 68 that are adapted to engage or abut the detents 66*a,b* in the locked position shown in FIGS. 1*a*-2*a*. The shoulders 68 cannot be rotated in direction D against the detents 66*a,b* unless the detents 66*a,b* are retracted.

Figure 2E:
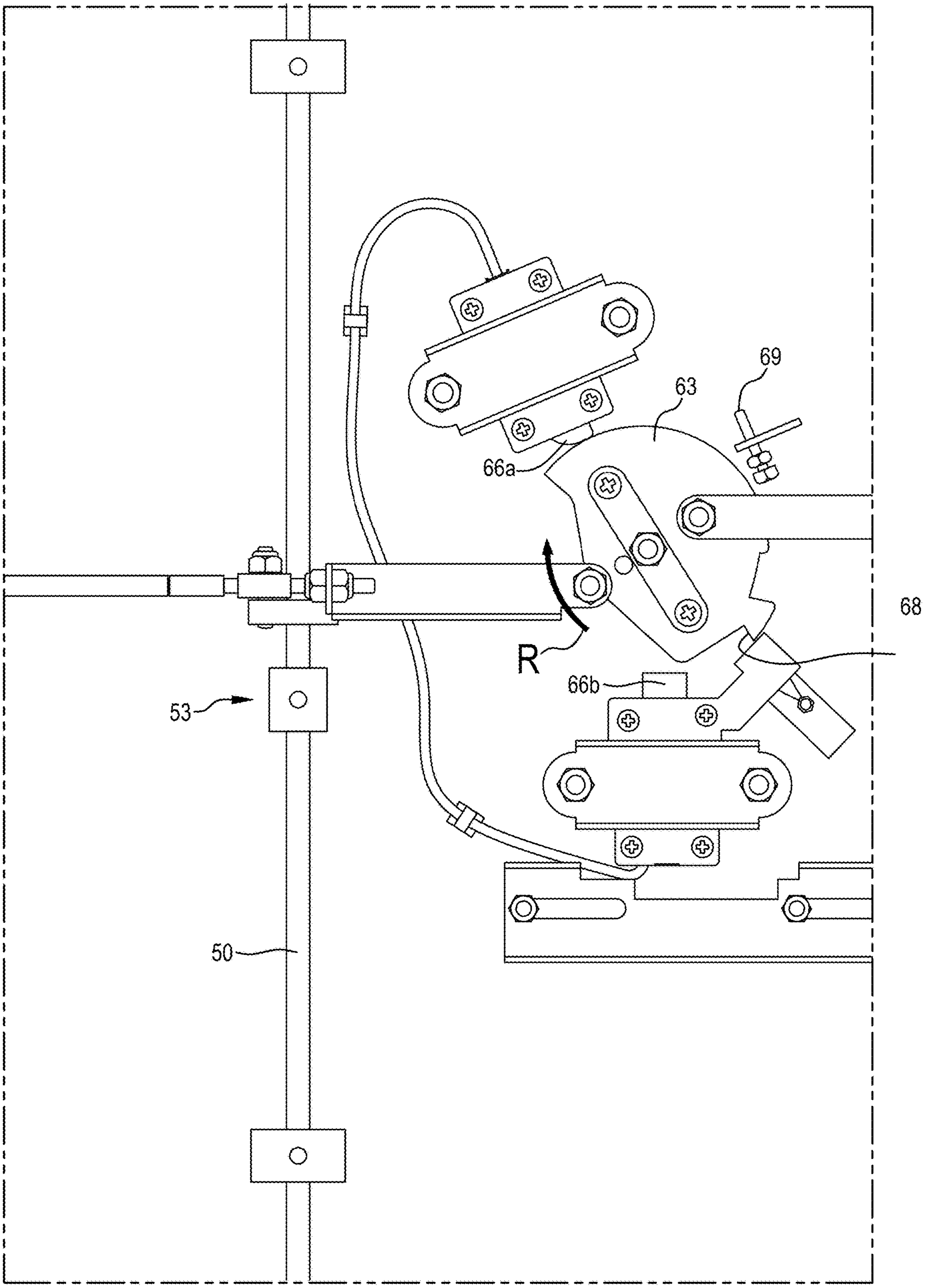
Figure 2F:
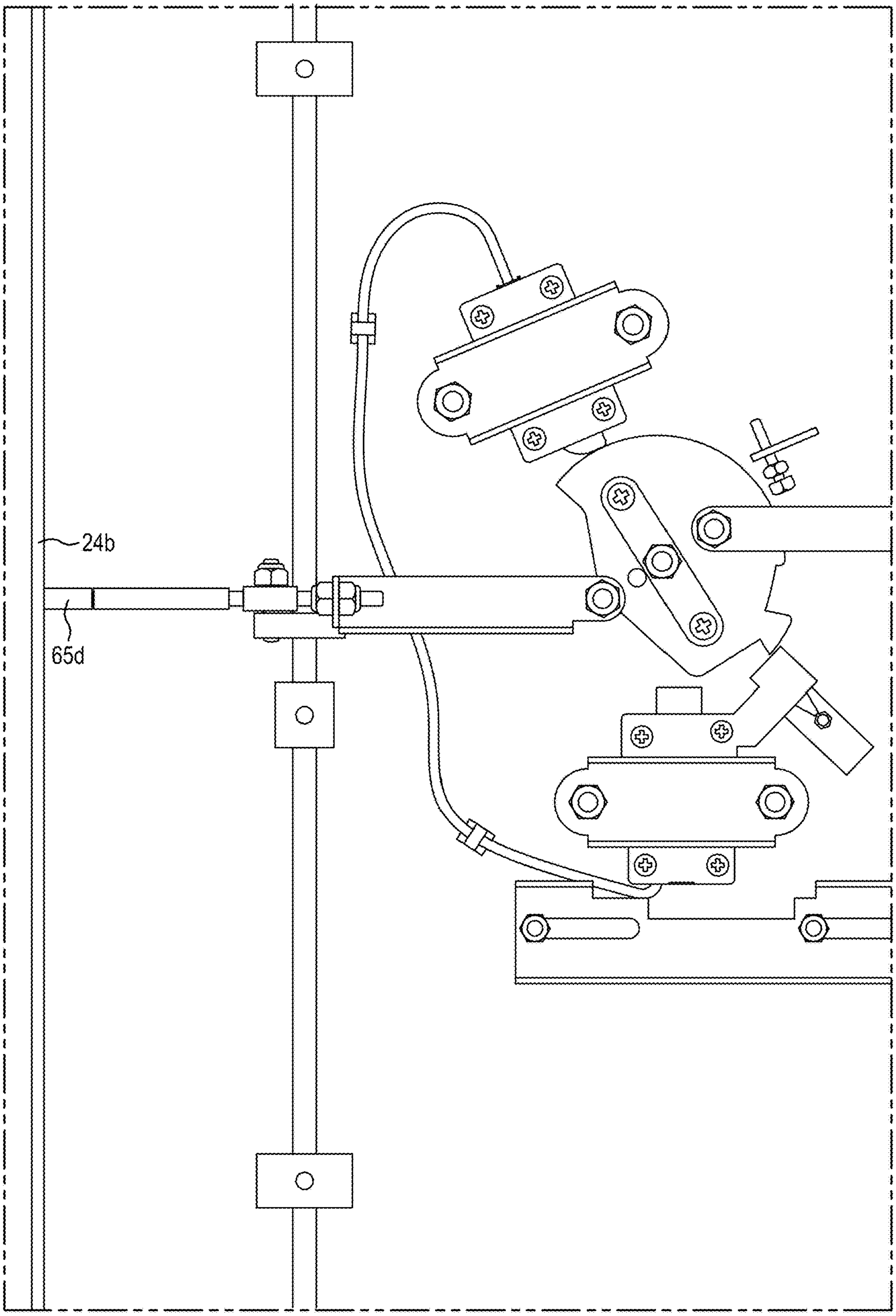
Figure 2G:
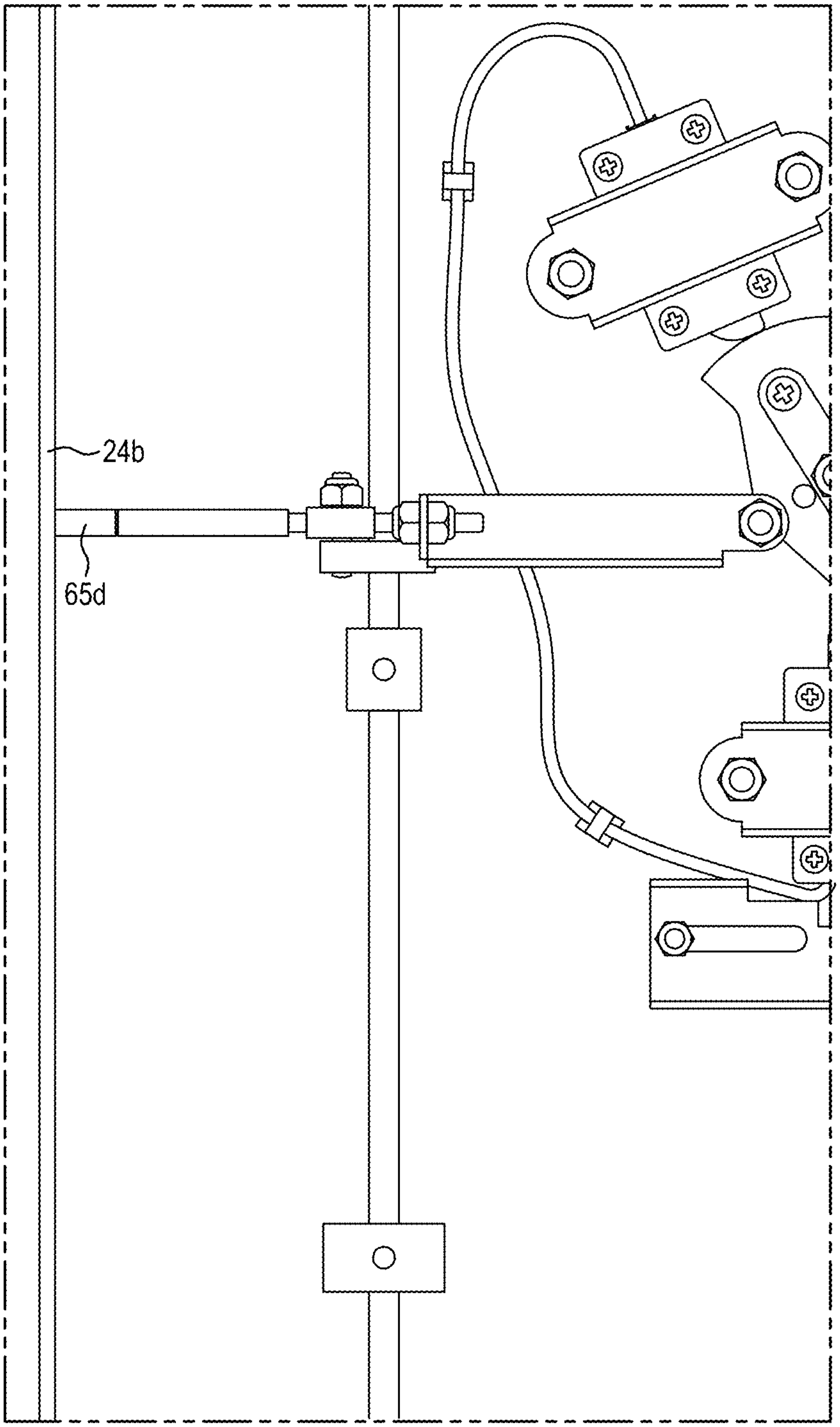
Figure 2H:
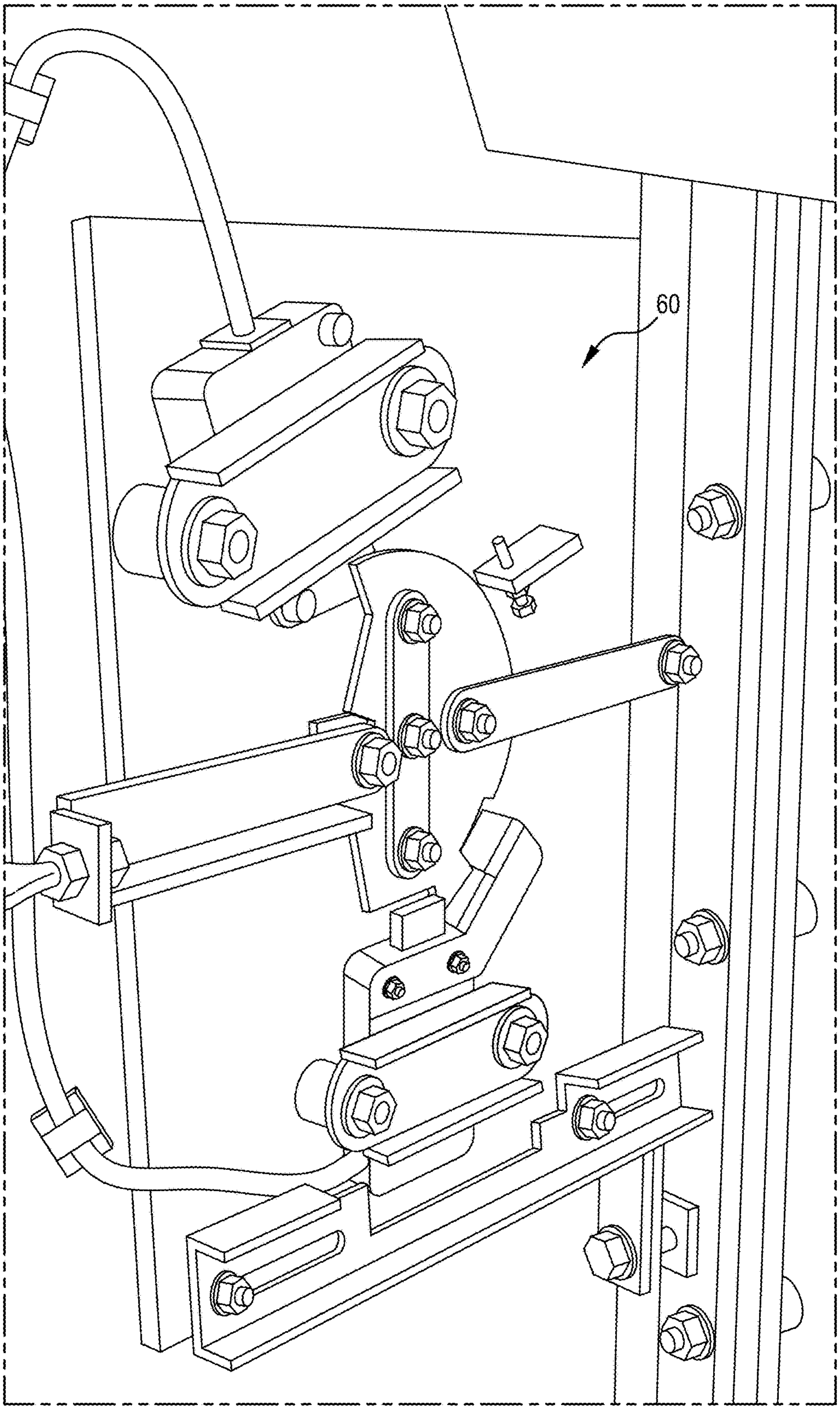

The extent of rotation of the crank 63 (in the anticlockwise direction D in FIGS. 2*b-d*), at the locking assembly's 60 open position, is limited by a stop 69 fixed to the rear face of the panel of the door 40. From the open position shown in FIG. 2*d*, the handle and crank 63 may be reversibly rotated in direction R, as shown in FIG. 2*e*, to return the locking mechanism 60 to its closed position.

The remote end 64*d* of the second arm 64*b* is fixed by a bolt to a vertical locking pin rail 45, with minor articulation made possible by ensuring that the second arm 64*b* is adapted to rotate through a small arc about a horizontal axis relative to the rail 45.

In the closed position, the crank assembly 60 includes the brace arm 65, and first and second arms 64*a,b* all in a straight line to form a brace assembly 65*b*. The components of the brace assembly 65*b* are linearly aligned and provide strong resistance to compression forces applied coaxially through the brace assembly 65*b*.

In the closed position, the arms 64*a,b* are at, for example, a horizontal orientation whereby their respective remote ends 64*d*,65*d*, are at their widest extent. In this position, the brace arm end 65*d* is contiguous with, or abutting, the side wall 24*b* and the remote end 64*d* fixed articulated and fixed to the rail 45 is fully extended, along with the locking bolts 46 mounted to the rail 45 that extend through apertures 29. Accordingly, the respective remote ends 65*d*,64*d* of the brace assembly 65*b* are radially displaced or spaced to their fullest extent from the axis A in the closed position.

The brace assembly has at least four hinge or articulated joints 51-52,64*e*,64*f*,64*d*. The brace arm eyelet 65*a* is secured or trapped on the pin or bolt 52 by a nut or clamp and mounted loosely on the combination of the guide member and pin 51-52. The brace arm 65 is therefore adapted to rock about a substantially horizontal axis aligned transverse to the bolt or pin 52 thereby forming the first of four articulated joints. A central pair of the articulated joints 64*e,f* are located on the periphery of the crank disc 63. The articulated joints 64*e,f* may be equispaced or otherwise radially spaced from the axis A. In the closed position, the central pair of joints may be aligned along a substantially horizontal line. The articulated joint 64*d* connecting the second arm to the rail 45 at the second edge 41 of the door 40. The articulated joints 51-52,64*e*,64*f*,64*d* each enable rotation of their respective component parts, the brace arm 65, and first and second arms 64*a*,64*b*, to rotate about an horizontal axis parallel to the axis A.

As the crank rotates in direction D about the axis A, the respective inner ends 64*e,f* of the first and second arms 64*b,c* rotatably mounted on the disc of the crank 63, respectively rotate away from the respective side walls 24*b,a*, drawing in the rail 45 and the brace arm end 65*d* toward the axis A, so that they are retracted toward the axis A. The retraction of the brace arm 65 toward the axis A allows the door 40 to be firstly moved substantially in a general plane of the door 40 toward the side wall 24*b*. Secondly, because the locking bolts 46 mounted to the rail 45 are retracted towards axis A, the second edge 41 is free to swing away from the jamb 27. The door 40 can be rotated about the door hinge elongate member 50 to achieve an open position of the door 40 and the safe 10.

The locking assembly 60 further includes a horizontal rail 74 movably connected to the internal face 42 of the door 40. The horizontal rail 74 includes a pair of horizontally spaced, coaxially aligned, slots 75 enclosing a corresponding pair of trapped bolts or pins 75*a,b* in the respective slots 75. The pins 75*a,b* are fixed to the internal face 42 and extend rearwardly and horizontally.

The horizontal rail 74 moves with the vertical rail 45 to which it is fixed by one or more attachment points 76. The attachment points may include a bracket 76*b* extending rearward from the horizontal rail 74, and fixed to a bracket 76*c* extending from the vertical rail 45 for additional rigidity in the attachment of the vertical and horizontal rails 45,74. Attachment points 76 may be secured using welds, or using bolts for adjustability.

The rails 45,74 are adapted to move together and the horizontal rail 75 reciprocates along a linear horizontal pathway P defined by the slots 75 riding along the pins 75*a,b*. In this way, the door is adapted to be slid sideways relative to the container body 20 toward the side wall 24*b* to clear the bolts 46 at the second edge 41, ready for rotation of the door closure 40 about the elongate member 50.

As the disc plate 63 rotates about axis A in direction D, the first and second arms move in substantially opposite directions $V_{1,2}$ whilst the horizontal rail 74 moves in a direction P opposite to direction P relative to the pins 75*a,b*.

Figure 2I:
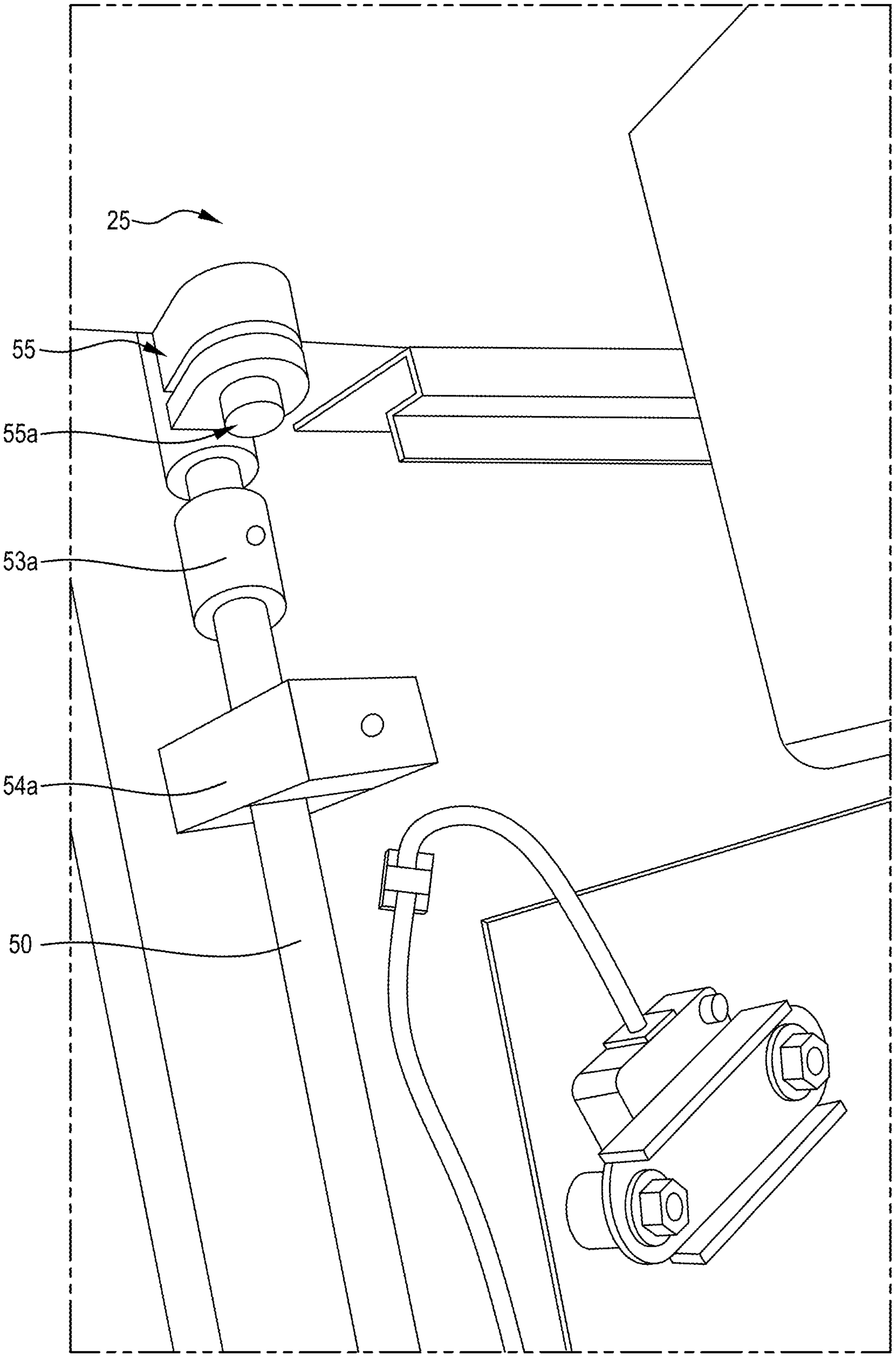

FIG. 2*i* shows that the upper end of the elongate member 50 is mounted via an upper hinge 55 to the top 25 of the container 20. The hinge 55 is rotatable about a pin 55*a* spaced from the elongate member axis X to enable the door 40 to rotate about the pin 55*a* and effectively shift sideways relative to the ceiling or top 25.

Figure 2J:
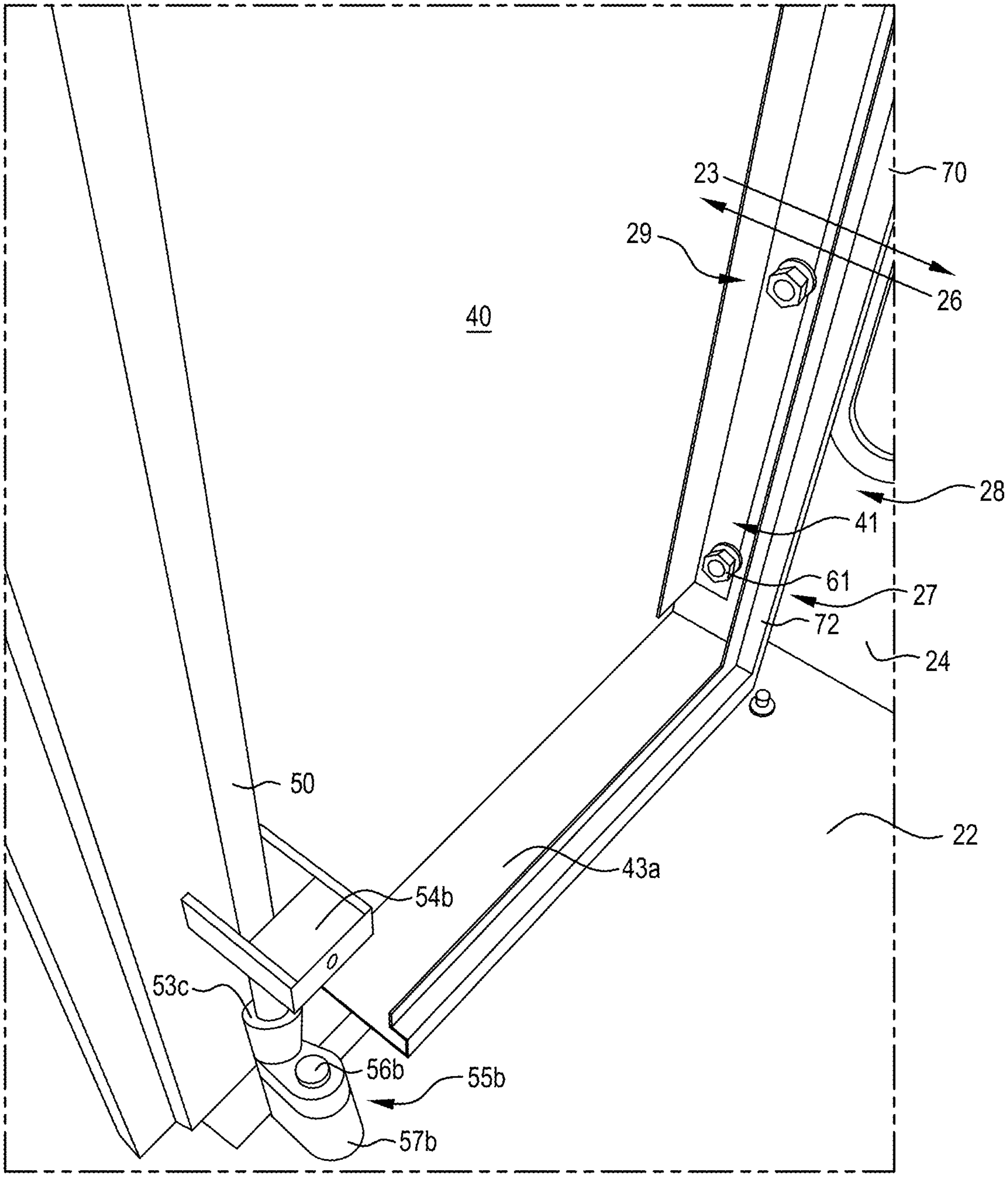

As shown in FIG. 2*j*, the lower end of the elongate member 50 is secured for rotation with a lower hinge 55*h* and hinge pin 56*h*. The lower hinge 55*h* is preferably a mirror image of the upper hinge 55*a*. The lower hinge 55*b* has a lower hinge base 57*b* is anchored to the container base 22 by welds. The hinges 55*a,b* and their respective hinge pins 55*a,b* are coaxially aligned so that, when the elongate member 50 and, consequently, the door 40, rotate about the hinges 55*a,b* in the direction C.

The container body 20 has a number of apertures 29 formed in a bolt-receiving side 28 of the jamb 27 to receive a corresponding number of door bolts 46 extendable from a second edge 41 of the door 40.

The container body 20 has a rolled channel section 70 comprising a first fold 71 (not shown) of the channel 70 that is welded top, middle and bottom of the length of the channel 70 to the body 20. The channel 70 has a second fold constituting a barrier panel 72 spaced from the first fold 71 and/or the jamb 27 a small distance of say 3-10 mm whereby to define a narrow longitudinal slot 73 (not shown).

The slot 73 is adapted to receive the vertical locking pin rail 45 acting as a guard member. The rail 45 is formed from multiple lengths of L-angle iron welded by one fold of the angle iron welded to the internal surface of the door 40 adjacent the second edge 41.

The locking mechanism 60 acts as a translation mechanism for the bolts 46. The door 40 further includes upper and lower guard flanges 43*a* to protect the door lock assembly 60 from upper or lower attack, respectively.

When the door 40 is closed, the door bolts 46 come into registration of bolt bore apertures 29 at appropriate places along the respective lengths of the vertical rail. Therefore, on actuation of a locking mechanism 60, the door bolts 46 travel home along a linear pathway in registration with the apertures 29. The rotatable locking mechanism 60 is lockable by any of various means, such as a conventional lock requiring a key or a combination lock.

The position of the vertical rail 45 adjacent a line where the second closure edge of the closed door 40 and the second edge 41 of the jamb 27 meet makes unauthorised tampering, damage or entry, for example by the insertion of a leverage implement at the line, extremely difficult. Not only are the body 20 and the door 40 made of heavy plate metal sheeting that is resistant to distortion, but the second edge 41 is reinforced by the vertical rail 45 in the closed position.

In FIG. 3, there is shown a second embodiment in which similar features are described with reference to similar references as for the first embodiment. The second embodiment has a hinge cover 58 mounted to the brackets 54*a,b*.

Figure 4A:
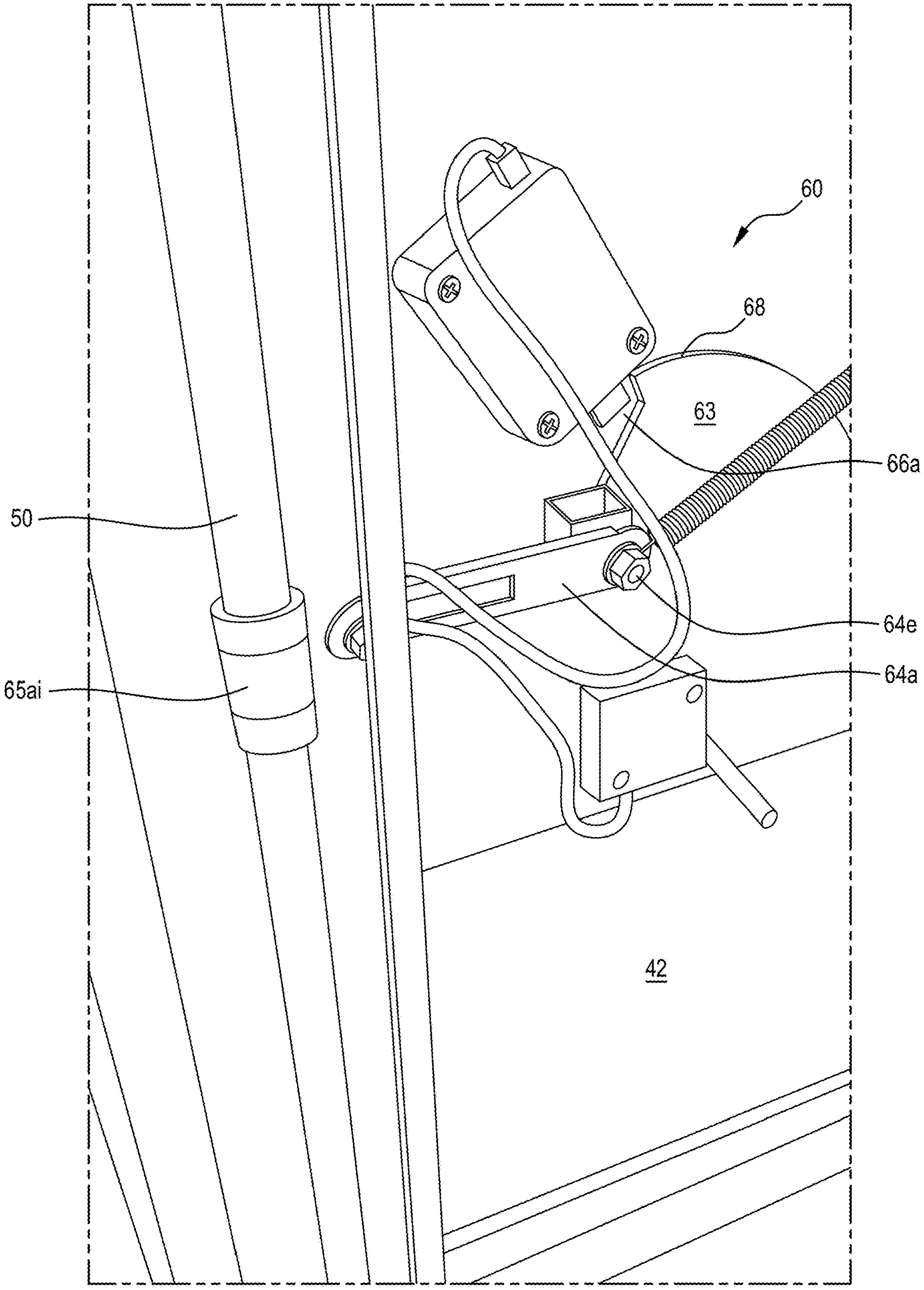
Figure 4B:
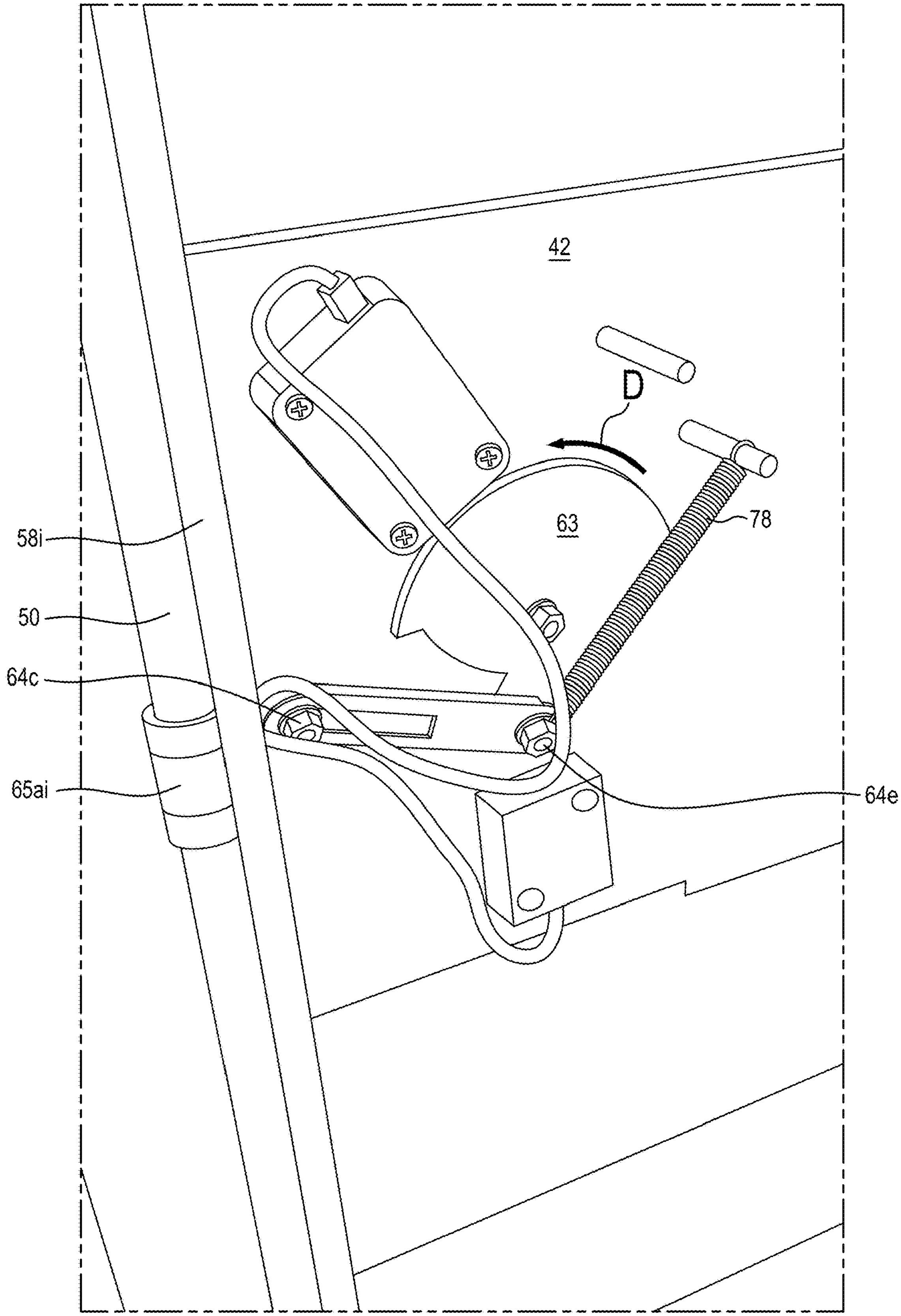
Figure 4C:
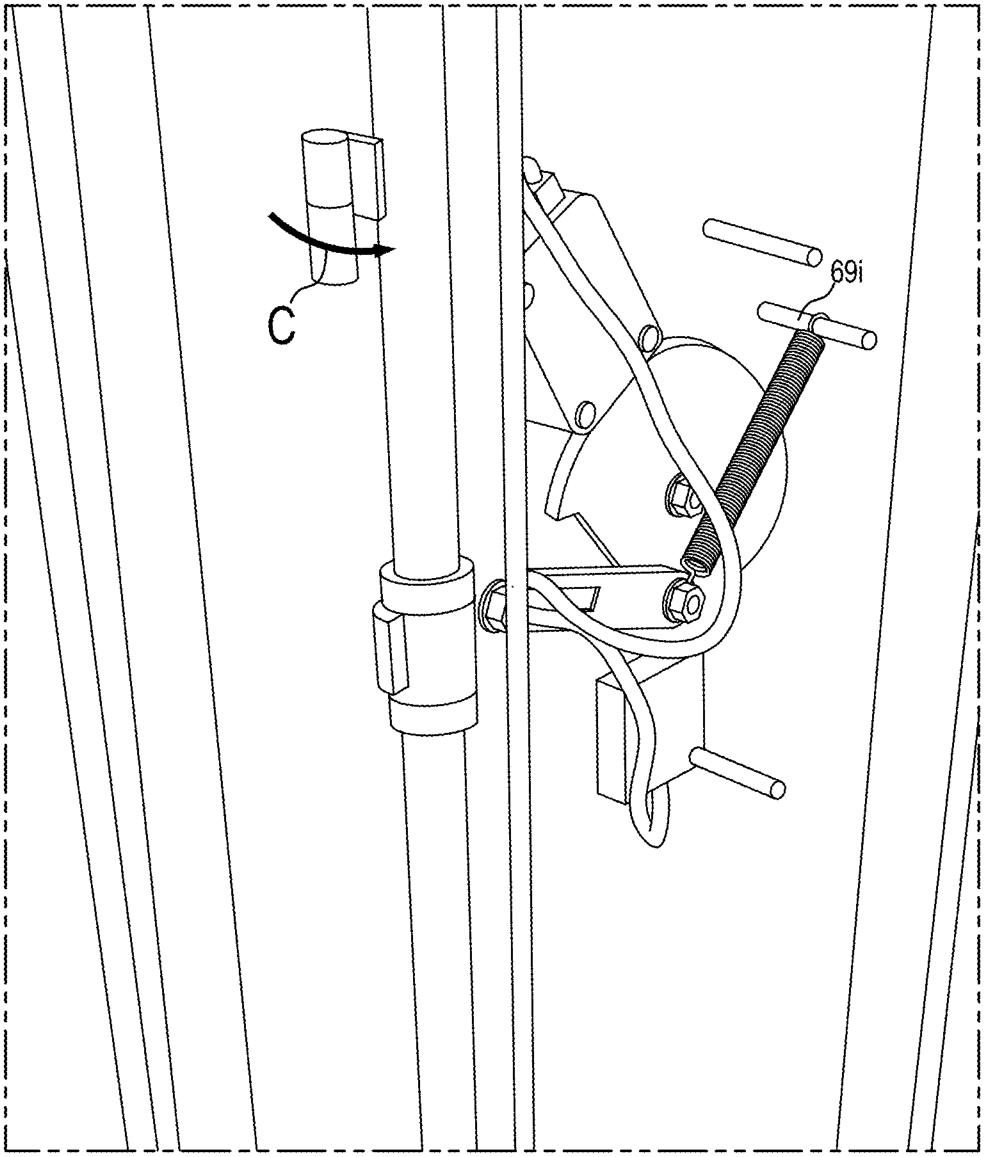

In FIGS. 4*a-c*, a third embodiment is shown in which the locking assembly does not include a brace arm. Rather the first arm 64*a* terminates at an intermediate journal mounting bracket 65*ai* attached to the elongate member 50. The journal bracket 53*b* operates in the same manner as the eyelet 65*a*.

Between an inner end 64*e* of the first arm 64*a* and an inner face door mounting point 69*i* is an axial extension coil spring 78 that resists rotation in direction D and assists to urge the locking mechanism back to a closed position. The spring 78 may work by pulling the articulation point 64*e* up and away from the elongate member 50.

Orientational terms used in the specification and claims such as vertical, horizontal, top, bottom, upper and lower are to be interpreted as relational and are based on the premise that the component, item, article, apparatus, device or instrument will usually be considered in a particular orientation, typically with the top 25 uppermost. In particular, the elongate member 50 may be any geometric orientation, but most typically the axis X is vertical. Correspondingly, the vertical rail 45 is aligned typically parallel to the axis X, whether that be vertical, horizontal or otherwise, and the horizontal rail 74 and/or the slots 75 are typically aligned normal to the axis X.

Throughout the specification and claims the word "comprise" and its derivatives are intended to have an inclusive rather than exclusive meaning unless the contrary is expressly stated or the context requires otherwise. That is, the word "comprise" and its derivatives will be taken to indicate the inclusion of not only the listed components, steps or features that it directly references, but also other components, steps or features not specifically listed, unless the contrary is expressly stated or the context requires otherwise.

In the present specification, terms such as "apparatus", "means", "device" and "member" may refer to singular or plural items and are terms intended to refer to a set of properties, functions or characteristics performed by one or more items or components having one or more parts. It is envisaged that where an "apparatus", "means", "device" or "member" or similar term is described as being a unitary object, then a functionally equivalent object having multiple components is considered to fall within the scope of the term, and similarly, where an "apparatus", "assembly", "means", "device" or "member" is described as having multiple components, a functionally equivalent but unitary object is also considered to fall within the scope of the term, unless the contrary is expressly stated or the context requires otherwise.

It will be appreciated by those skilled in the art that many modifications and variations may be made to the methods of the invention described herein without departing from the spirit and scope of the invention.

Table of References in the Drawings

| Ref. | Description |
|---|---|
| A | Axis of handle and crank |
| X | Axis of shaft |
| X1 | Axis of rotation of guide |
| C | Arc of rotation of the eyelet |
| D | Anticlockwise direction of crank |
| T | Tilt direction of brace arm |
| P | Pathway of travel of hoz. rail |
| 10 | Gun safe |
| 20 | Container body |
| 21 | Cavity |
| 22 | Base |
| 23 | Rear wall |
| 24 | Side walls |
| 24b | Bracing member/side wall |
| 25 | Top |
| 26 | Opening |
| 27 | Door jamb |
| 28a | First hinged end of jamb |
| 28b | Second bolt-receiving side of the jamb |
| 29 | Apertures |
| 30 | Hinge mechanism |
| 31 | Linear rod (elongate member) |
| 40 | Security door |
| 41 | Second edge at free end of door |
| 42 | Internal face of the door |
| 43a | Upper and lower guard flanges |
| 44a | First edge at hinged end of closure |
| 45 | Locking pin rail |
| 46 | Locking bolts |
| 47 | Apertures in the guard member |
| 48 | Rotatable handle mechanism |
| 49 | Door exterior |
| 50 | Elongate member or shaft |
| 50a | Shaft section |
| 51 | Guide member - Elongate member eyelet |
| 52 | pin |
| 53a, b, c | Upper, intermediate and lower cylindrical hinge journals |
| 54a, b | Upper and lower brackets |
| 55a, b | Upper and lower hinges |
| 56a, b | Upper and lower hinge pins |
| 57a, b | Hinge base |
| 58 | hinge cover |
| 60 | Locking assembly |
| 61 | |
| 62 | Crank assembly |
| 63 | Central crank |
| 64 | Pair of opposed arms |
| 64a | First arm |
| 64b | Second arm |
| 64c | Lateral flange |
| 64d | Remote end of the second arm |
| 64e, f | Inner ends |
| 65 | Brace arm |
| 65a | Eyelet of the brace arm |

-continued

Table of References in the Drawings

| Ref. | Description |
|---|---|
| 65d | Brace arm end |
| 65b | Brace assembly |
| 66a, b | detents |
| 62a | cables |
| 68 | shoulders |
| 69 | stop |
| 70 | Rolled channel section |
| 71 | First arm of channel |
| 72 | Barrier panel |
| 73 | Narrow longitudinal slot |
| 74 | Horizontal rail |
| 75 | Slots |
| 75a, b | Pins |
| 76 | Attachment points |
| 76a, b, c | Attachment brackets |
| 77 | Apertures in the barrier panel |
| 78 | spring |

SEQUENCE LISTING

Not Applicable.

The invention claimed is:

1. A security door mounting arrangement for securing a door of a container, the security door mounting arrangement including:
   - a jamb defining a closure space;
   - a door having a first closure edge hingedly mounted on or near a first edge of the jamb, and a second closure edge abutting a second edge of the jamb; and
   - a locking bolt extendable from the second closure edge and operative to be received in, on or near the second edge of the jamb in a closed position of the door, wherein:
     - the door includes an elongate member that extends along the first closure edge, wherein an axis of the elongate member is fixed relative to the door;
     - a hinge device includes the elongate member, the hinge device is adapted to permit rotation of the door, the hinge device includes at least two hinge axes;
     - the elongate member has upper first and lower second sections, which are located along a length of the elongate member and are mounted to a corresponding pair of first and second short arms;
     - the first and second short arms are rotatably attached to the respective upper and lower portions of the elongate member; and
     - at an intermediate section intermediate the length of the elongate member, the door further includes a reinforcing member fixedly attached to an internal surface of the door and adapted to resist flexing of the elongate member at the intermediate section;
   - wherein the reinforcing member is in the form of a brace arm extending from the elongate member and directly or indirectly attaching to the internal surface of the door, wherein the brace arm is connected to a door release mechanism that is adapted to move to lock or release the door as the brace arm moves towards or away from a bracing member,
   - wherein the brace arm comprises a linear beam that abuts the bracing member when the door release mechanism is in a locked position, and
   - wherein the container is a safe and the bracing member is a side wall of the safe.

2. The security door mounting arrangement as claimed in claim 1, wherein the closure space is in a body of the container, the container includes the jamb and the locking bolt, and the first and second short arms are rotatably attached to respective upper and lower portions of the container.

3. The security door mounting arrangement as claimed in claim 2, wherein the reinforcing member includes a guide that physically traps the intermediate section to resist against lateral displacement.

4. The security door mounting arrangement as claimed in claim 1, wherein the brace arm forms part of a bracket fixedly secured to the internal surface of the door and the guide encapsulates the intermediate section.

5. The security door mounting arrangement as claimed in claim 1, wherein the brace arm is movably attached to the elongate member whereby movement of the brace arm corresponds to the movement of the door release mechanism, such that the brace arm moves when the door release mechanism moves and otherwise, in a locked position, resists flexing of the elongate member.

6. The security door mounting arrangement as claimed in claim 5, wherein the door release mechanism is adapted to rotate relative to the door and the brace arm is articulatedly connected to the door release mechanism.

7. The security door mounting arrangement as claimed in claim 6, wherein the brace arm comprises a substantially linear beam extending from the door release mechanism to an outer tip of the brace arm.

8. The security door mounting arrangement as claimed in claim 7, wherein the linear beam includes a hinged connection with the elongate member intermediate their respective lengths.

9. The security door mounting arrangement as claimed in claim 8, wherein the hinged connection includes a lateral arm that extends from the elongate member.

10. The security door mounting arrangement as claimed in claim 9, wherein the lateral arm rotates with the elongate member, the hinged connection including a pin extending through or into an eyelet or socket.

11. The security door mounting arrangement as claimed in claim 1, wherein the at least two hinge axes include a first axis and a second axis, the second axis being parallel to and spaced from the first axis.

12. The security door mounting arrangement as claimed in claim 1, wherein the door release mechanism has a lock assembly mounted on an interior face of the door or housed in a cavity within the door, the lock assembly including a rotating mechanism operably connected to the locking bolt, the locking bolt including an elongate shaft that is adapted to be actuated by the rotating mechanism.

13. The security door mounting arrangement as claimed in claim 12, wherein the locking bolt is adapted to reciprocally translate along a linear path, being trapped against lateral movement, but permitted to slide back and forth, the rotating mechanism including an articulated arm mounted at one end to the periphery of a rotatable disc.

14. The security door mounting arrangement as claimed in claim 13, wherein a remote end of the articulated arm is mounted to the locking bolt, rotation of the disc being adapted to reciprocally retract the articulated arm, and hence the locking bolt and the door, into an open position, or to extend the articulated arm, and hence the locking bolt and door, into a closed position.

15. The security door mounting arrangement as claimed in claim 1, wherein the door includes a guard member aligned in a plane transverse to the direction of reciprocal travel of the locking bolt and attached to the internal surface of the door, the security door mounting arrangement further including a barrier panel extending adjacent to the jamb near the second edge when the door is closed and defining an elongate slot adapted to nest the guard member in the slot in the closed position.

16. The security door mounting arrangement as claimed in claim 15, wherein the guard member and the barrier panel do not extend the full way across the jamb, but are located in a zone of the locking bolt.

17. A security door mounting arrangement for securing a door of a container, the security door mounting arrangement including:

a jamb defining a closure space;

a door having a first closure edge hingedly mounted on or near a first edge of the jamb, and a second closure edge abutting a second edge of the jamb; and a locking bolt extendable from the second closure edge and operative to be received in, on or near the second edge of the jamb in a closed position of the door, wherein:

the door includes an elongate member that extends along the first closure edge, wherein an axis of the elongate member is fixed relative to the door;

a hinge device includes the elongate member, the hinge device is adapted to permit rotation of the door, the hinge device includes at least two hinge axes;

the elongate member has upper first and lower second sections, which are located along a length of the elongate member and are mounted to a corresponding pair of first and second short arms;

the first and second short arms are rotatably attached to the respective upper and lower portions of the elongate member; and at an intermediate section intermediate the length of the elongate member, the door further includes a reinforcing member fixedly attached to an internal surface of the door and adapted to resist flexing of the elongate member at the intermediate section;

wherein the reinforcing member is in the form of a brace arm extending from the elongate member and directly or indirectly attaching to the internal surface of the door, wherein the brace arm is connected to a door release mechanism that is adapted to move to lock or release the door as the brace arm moves towards or away from a bracing member, wherein the container is a safe and the bracing member is a side wall of the safe, and wherein the brace arm is movably attached to the elongate member whereby movement of the brace arm corresponds to the movement of the door release mechanism, such that the brace arm moves when the door release mechanism moves and otherwise, in a locked position, resists flexing of the elongate member.

* * * * *